(12) United States Patent
Park et al.

(10) Patent No.: US 10,063,878 B2
(45) Date of Patent: Aug. 28, 2018

(54) INTERLAYER VIDEO ENCODING METHOD USING BRIGHTNESS COMPENSATION AND DEVICE THEREOF, AND VIDEO DECODING METHOD AND DEVICE THEREOF

(71) Applicant: SAMSUNG ELECTRONICS CO., LTD., Suwon-si (KR)

(72) Inventors: Min-woo Park, Yongin-si (KR); Jin-young Lee, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 248 days.

(21) Appl. No.: 15/187,160

(22) Filed: Jun. 20, 2016

(65) Prior Publication Data

US 2016/0295227 A1 Oct. 6, 2016

Related U.S. Application Data

(63) Continuation of application No. PCT/KR2014/012669, filed on Dec. 22, 2014.
(Continued)

(51) Int. Cl.
*H04N 19/513* (2014.01)
*H04N 19/597* (2014.01)
(Continued)

(52) U.S. Cl.
CPC ......... *H04N 19/513* (2014.11); *H04N 19/176* (2014.11); *H04N 19/30* (2014.11);
(Continued)

(58) Field of Classification Search
CPC .. H04N 19/176; H04N 19/513; H04N 19/597; H04N 19/30
(Continued)

(56) References Cited

U.S. PATENT DOCUMENTS

2012/0269269 A1   10/2012   Choi et al.
2014/0241435 A1   8/2014    Park et al.
(Continued)

FOREIGN PATENT DOCUMENTS

KR   10-2012-0118780 A   10/2012
KR   10-2013-0002243 A   1/2013
(Continued)

OTHER PUBLICATIONS

Search Report dated Mar. 12, 2015, issued by the International Searching Authority in counterpart International Patent Application No. PCT/KR2014/012669 (PCT/ISA/210).
(Continued)

*Primary Examiner* — Nguyen Truong
(74) *Attorney, Agent, or Firm* — Sughrue Mion, PLLC

(57) ABSTRACT

Provided is an interlayer video decoding method. The interlayer video decoding method includes: obtaining brightness compensation information indicating whether a second layer current block performs brightness compensation; determining whether a candidate of the second layer current block is usable as a merge candidate based on whether the brightness compensation information indicates that the brightness compensation is performed and whether the candidate of the second layer current block performs time direction inter prediction; generating a merge candidate list including at least one merge candidate based on a result of the determining; and determining motion information of the second layer current block by using motion information of one of the at least one merge candidate.

15 Claims, 24 Drawing Sheets

Related U.S. Application Data

(60) Provisional application No. 61/919,068, filed on Dec. 20, 2013.

(51) Int. Cl.
*H04N 19/30* (2014.01)
*H04N 19/176* (2014.01)
*H04N 19/52* (2014.01)
*H04N 19/70* (2014.01)
*H04N 19/593* (2014.01)

(52) U.S. Cl.
CPC ........... *H04N 19/52* (2014.11); *H04N 19/593* (2014.11); *H04N 19/597* (2014.11); *H04N 19/70* (2014.11)

(58) Field of Classification Search
USPC .................................................... 375/240.16
See application file for complete search history.

(56) References Cited

U.S. PATENT DOCUMENTS

| | | |
|---|---|---|
| 2014/0362906 A1 | 12/2014 | Kim et al. |
| 2016/0044331 A1 | 2/2016 | Lim et al. |

FOREIGN PATENT DOCUMENTS

| | | |
|---|---|---|
| KR | 10-2013-0048122 A | 5/2013 |
| KR | 10-2013-0059288 A | 6/2013 |
| KR | 10-2013-0085013 A | 7/2013 |
| WO | 2013/106336 A2 | 7/2013 |

OTHER PUBLICATIONS

Written Opinion dated Mar. 12, 2015, issued by the International Searching Authority in counterpart International Patent Application No. PCT/KR2014/012669 (PCT/ISA/237).

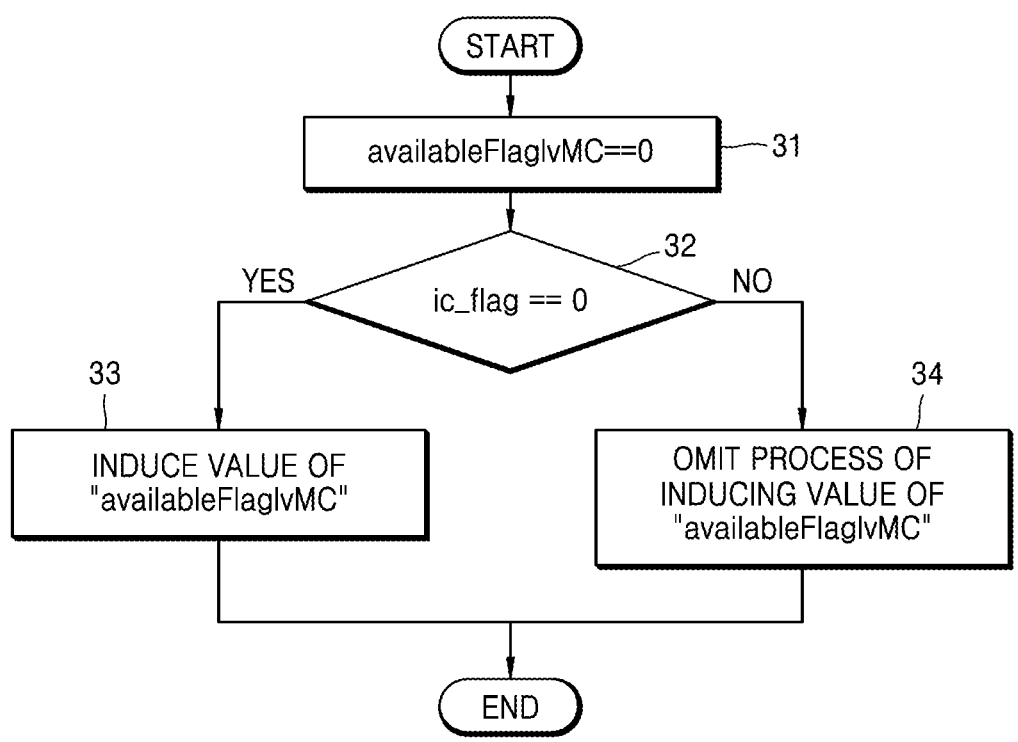

FIG. 15
PARTITION MODE (800)
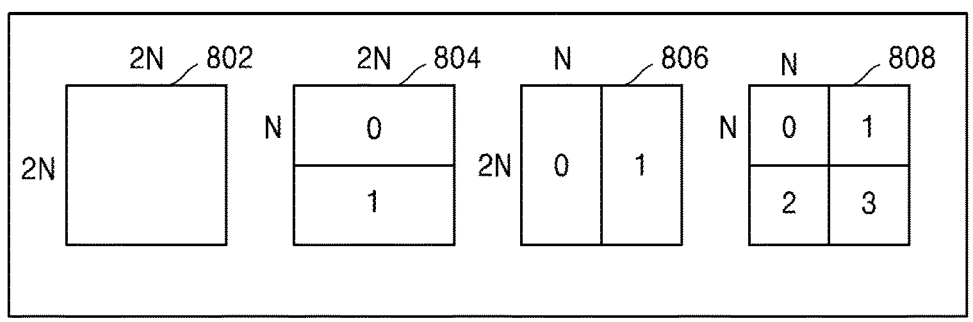
PREDICTION MODE (810)
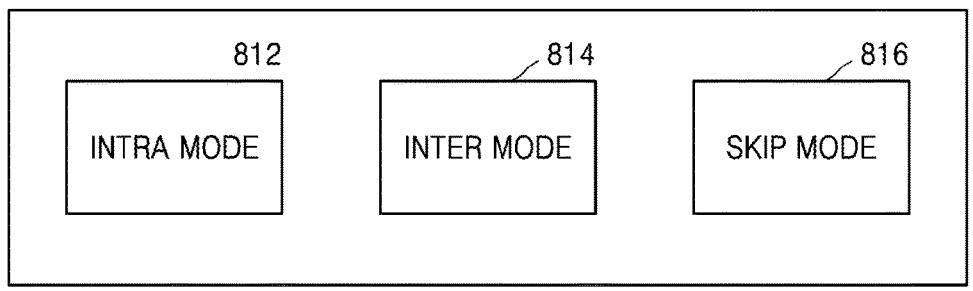
SIZE OF TRANSFORMATION UNIT (820)
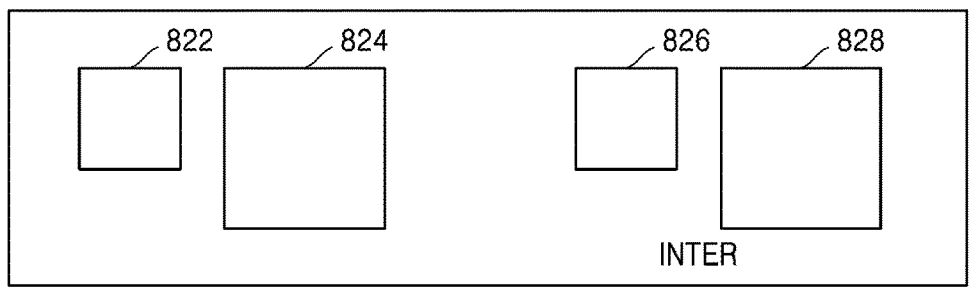

CODING UNIT (1010)

INTERLAYER VIDEO ENCODING METHOD USING BRIGHTNESS COMPENSATION AND DEVICE THEREOF, AND VIDEO DECODING METHOD AND DEVICE THEREOF

This is a bypass continuation of International Application No. PCT/KR2014/012669 filed on Dec. 22, 2014, and claims priority from U.S. Provisional Application No. 61/919,068, filed on Dec. 20, 2013, the entire disclosures of which are incorporated herein by reference in their entireties.

TECHNICAL FIELD

The present invention relates to an interlayer video encoding method and decoding method, and more particularly, to a method of generating a merge candidate list of a current block based on whether the current block performs brightness compensation.

BACKGROUND ART

As hardware for reproducing and storing high resolution or high quality video content is being developed and supplied, a need for a video codec for effectively encoding or decoding the high resolution or high quality video content is increasing. According to a conventional video codec, a video is encoded according to a limited encoding method based on a coding unit having a predetermined size.

Image data of the space domain is transformed into coefficients of the frequency domain via frequency transformation. According to a video codec, an image is split into blocks having a predetermined size, discrete cosine transformation (DCT) is performed on each block, and frequency coefficients are encoded in block units, for rapid calculation of frequency transformation. Compared with image data of the space domain, coefficients of the frequency domain are easily compressed. In particular, since an image pixel value of the space domain is expressed according to a prediction error via inter prediction or intra prediction of a video codec, when frequency transformation is performed on the prediction error, a large amount of data may be transformed to 0. According to a video codec, an amount of data may be reduced by replacing data that is consecutively and repeatedly generated with smaller-sized data.

In a multilayer video codec, a first layer video and at least one second layer video are encoded and decoded. Amounts of data of the first and second layer videos may be reduced by removing temporal/spatial redundancy and layer redundancy of the first and second layer videos.

DETAILED DESCRIPTION OF THE INVENTION

Technical Problem

One or more embodiments of the present invention include a method of efficiently generating a merge candidate list of a current block based on whether the current block performs brightness compensation. Also, one or more embodiments of the present invention include an interlayer video encoding method and apparatus for reducing operation complexity, and an interlayer video decoding method.

Technical Solution

According to one or more embodiments of the present invention, an interlayer video decoding method includes: obtaining brightness compensation information indicating whether a second layer current block performs brightness compensation; when the brightness compensation information indicates that the brightness compensation is not performed, determining merge candidate possibility information indicating whether a first layer candidate block corresponding to the current block is usable as a merge candidate based on whether the first layer candidate block performs inter prediction; generating a merge candidate list including at least one merge candidate block based on the merge candidate possibility information; and determining motion information of the current block by using motion information of one of the at least one merge candidate block.

Advantageous Effects of the Invention

Complexity of operations is reduced while performing interlayer video encoding/decoding by efficiently generating a merge candidate list of a current block based on whether the current block performs brightness compensation.

DESCRIPTION OF THE DRAWINGS

FIG. 3 is a flowchart for describing a method of determining, by an interlayer video decoding apparatus 20 according to various embodiments, merge candidate possibility information based on whether a current block performs brightness compensation.

FIG. 15 is a diagram for describing encoding information according to an embodiment.

BEST MODE

Figure 1A:
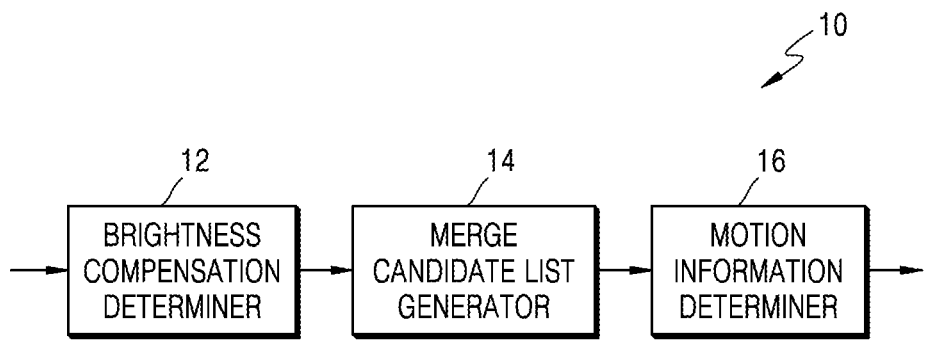
FIG. 1A is a block diagram of an interlayer video encoding apparatus 10 according to various embodiments.

One or more embodiments of the present invention include a method of efficiently generating a merge candidate list of a current block based on whether the current block performs brightness compensation. Also, one or more embodiments of the present invention include an interlayer video encoding method and apparatus, and an interlayer video decoding method, which are capable of reducing operation complexity.

According to one or more embodiments of the present invention, an interlayer video decoding method includes: obtaining brightness compensation information indicating whether a second layer current block performs brightness compensation; determining whether a candidate of the second layer current block is usable as a merge candidate based on whether the brightness compensation information indicates that the brightness compensation is performed and whether the candidate of the second layer current block performs time direction inter prediction; generating a merge candidate list including at least one merge candidate based on a result of the determining; and determining motion information of the second layer current block by using motion information of one of the at least one merge candidate.

When the brightness compensation information of the second layer current block indicates that the brightness compensation is performed and the candidate of the second layer current block performs the time direction inter prediction, the merge candidate list may be generated excluding the candidate of the second layer current block.

The candidate may be based on motion information of a corresponding block indicated by a disparity vector of the second layer current block from a location of the second layer current block.

The candidate may be based on motion information of a right lower block of a corresponding block indicated by a disparity vector of the second layer current block from a location of the second layer current block.

When the brightness compensation information indicates that the brightness compensation is performed, some or all of other candidates having a same motion vector and a same reference index as a motion vector and a reference index from among motion information of the candidate may not be included in the merge candidate list.

When the brightness compensation information indicates that the brightness compensation is performed, some or all of other candidates having a same reference index from among motion information of the candidate may not be included in the merge candidate list.

The candidate may be based on motion information of a block corresponding to a disparity vector of the second layer current block from a location of the second layer current block, and the interlayer video decoding method may further include, when the brightness compensation information indicates that the brightness compensation is not performed, determining a vertical component of the disparity vector to be 0.

According to one or more embodiments of the present invention, an interlayer video encoding method includes: determining whether a second layer current block performs brightness compensation; determining whether a candidate of the second layer current block is usable as a merge candidate based on whether the second layer current block performs the brightness compensation and whether the candidate of the second layer current block performs time direction inter prediction; generating a merge candidate list including at least one merge candidate based on a result of the determining; and determining motion information of the second layer current block by using motion information of one of the at least one merge candidate.

When the second layer current block performs the brightness compensation and the candidate of the second layer current block performs the time direction inter prediction, the merge candidate list may be generated excluding the candidate of the second layer current block.

The candidate may be based on motion information of a corresponding block indicated by a disparity vector of the second layer current block from a location of the second layer current block.

The candidate may be based on motion information of a right lower block of a corresponding block indicated by a disparity vector of the second layer current block from a location of the second layer current block.

When the second layer current block performs the brightness compensation, some or all of other candidates having a same motion vector and a same reference index as a motion vector and a reference index from among motion information of the candidate may not be included in the merge candidate list.

When the brightness compensation information indicates that the brightness compensation is performed, some or all of other candidates having a same reference index from among motion information of the candidate may not be included in the merge candidate list.

The candidate may be based on motion information of a block corresponding to a disparity vector of the second layer current block from a location of the second layer current block, and the interlayer video decoding method may further include, when the brightness compensation information indicates that the brightness compensation is not performed, determining a vertical component of the disparity vector to be 0.

According to one or more embodiments of the present invention, a non-transitory computer-readable recording medium has recorded thereon a program, which when executed by a computer, performs the interlayer video decoding method.

According to one or more embodiments of the present invention, a non-transitory computer-readable recording medium has recorded thereon a program, which when executed by a computer, performs the interlayer video encoding method.

MODE OF THE INVENTION

Hereinafter, an interlayer video encoding technique and an interlayer video decoding technique based on whether brightness compensation is performed according to various embodiments are suggested with reference to FIGS. 1A through 7. Also, a video encoding technique and a video decoding technique based on coding units of a tree structure according to various embodiments, which are applicable to the interlayer video encoding technique and decoding technique, are suggested with reference to FIGS. 8 through 20. Also, various embodiments to which the video encoding method and the video decoding method are applicable are suggested with reference to FIGS. 21 through 27.

Hereinafter, an 'image' may denote a still image or a moving image of a video, or a video itself.

Hereinafter, a 'sample' denotes data that is assigned to a sampling location of an image and is to be processed. For example, pixels in an image of a spatial domain may be samples.

First, an interlayer video encoding apparatus and an interlayer video encoding method and an interlayer video encoding apparatus, and an interlayer video decoding method, according to embodiments, will be described with reference to FIGS. 1A through 7.

Figure 1B:
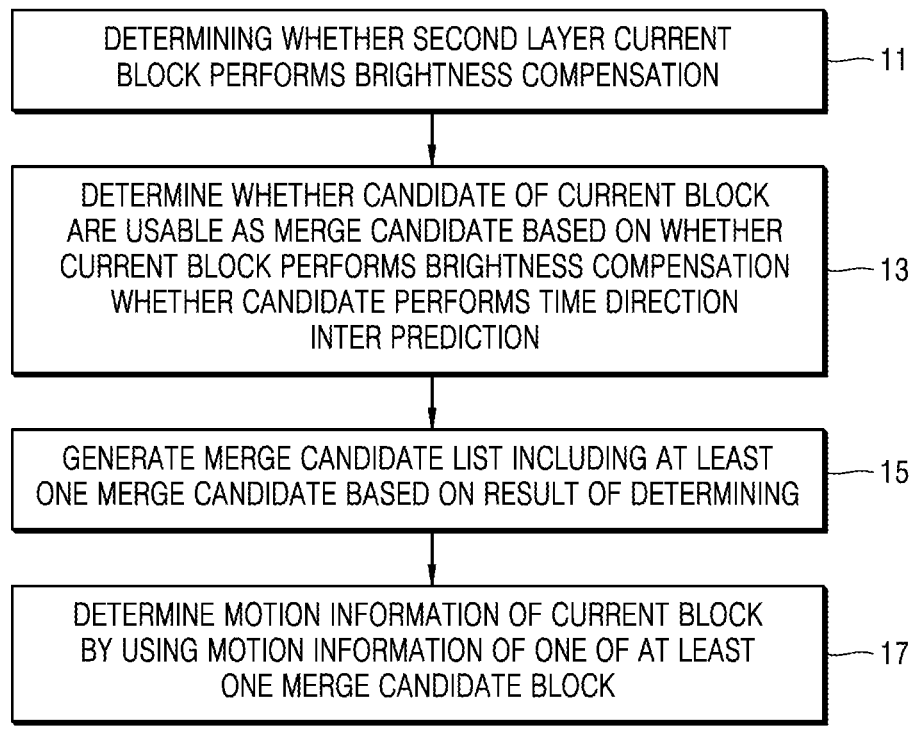
FIG. 1B is a flowchart of an interlayer video encoding method according to various embodiments.

FIG. 1A is a block diagram of an interlayer video encoding apparatus 10 according to various embodiments. FIG. 1B is a flowchart of an interlayer video encoding method according to various embodiments.

The interlayer video encoding apparatus 10 according to various embodiments may include a brightness compensation determiner 12, a merge candidate list generator 14, and a motion information determiner 16.

The interlayer video encoding apparatus 10 according to various embodiments may classify a plurality of image sequences according to layers and encode each of the image sequences according to a scalable video coding method, and output separate streams including data encoded according to layers. The interlayer video encoding apparatus 10 may encode a first layer image sequence and a second layer image sequence to different layers.

For example, according to a scalable video coding method based on spatial scalability, low resolution images may be encoded as first layer images, and high resolution images may be encoded as second layer images. An encoding result of the first layer images is output as a first layer stream, and an encoding result of the second layer images is output as a second layer stream.

The interlayer video encoding apparatus 10 according to an embodiment may express and encode the first layer stream and the second layer stream as one bitstream through a multiplexer.

As another example, a multiview video may be encoded according to a scalable video coding method. In this case, left view images may be encoded as first layer images and right view images may be encoded as second layer images. Alternatively, central view images, left view images, and right view images may be each encoded, wherein the central view images are encoded as first layer images, the left view images are encoded as second layer images, and the right view images are encoded as third layer images. Alternatively, a central view color image, a central view depth image, a left view color image, a left view depth image, a right view color image, and a right view depth image may be respectively encoded as a first layer image, a second layer image, a third layer image, a fourth layer image, a fifth layer image, and a sixth layer image. As another example, a central view color image, a central view depth image, a left view depth image, a left view color image, a right view depth image, and a right view color image may be respectively encoded as a first layer image, a second layer image, a third layer image, a fourth layer image, a fifth layer image, and a sixth layer image.

As another example, a scalable video coding method may be performed according to temporal hierarchical prediction based on temporal scalability. A first layer stream including encoding information generated by encoding base frame rate images may be output. Temporal levels may be classified according to frame rates and each temporal level may be encoded according to layers. A second layer stream including encoding information of a high frame rate may be output by further encoding higher frame rate images by referring to the base frame rate images.

Also, scalable video coding may be performed on a first layer and a plurality of extension layers (a second layer through a K-th layer). When there are at least three extension layers, first layer images and K-th layer images may be encoded. Accordingly, an encoding result of the first layer images may be output as a first layer stream, and encoding results of the first through K-th layer images may be respectively output as first through K-th layer streams.

The interlayer video encoding apparatus 10 according to various embodiment may perform inter prediction in which images of a single layer are referenced in order to predict a current image. By performing inter prediction, a motion vector indicating motion information between a current image and a reference image and a residual between the current image and the reference image may be predicted from a region corresponding to a first layer (base layer).

Also, the interlayer video encoding apparatus 10 may perform interlayer prediction in which prediction information of first layer images are referenced in order to predict prediction information of second layer images.

Also, when the interlayer video encoding apparatus 10 according to an embodiment allows at least three layers, i.e., first through third layers, interlayer prediction between a first layer image and a third layer image, and interlayer prediction between a second layer image and a third layer image may be performed according to a multilayer prediction structure.

In interlayer prediction, a disparity vector between a current image and a reference image of a layer different from that of the current image may be induced, and a residual that is a difference component between the current image and a prediction image generated by using the reference image of the different layer may be generated.

The interlayer video encoding apparatus 10 according to various embodiments may perform encoding according to blocks of each image of a video, according to layers. A block may have a square shape, a rectangular shape, or an arbitrary geometrical shape, and is not limited to a data unit having a predetermined size. The block may be a maximum coding unit, a coding unit, a prediction unit, or a transformation unit, among coding units according to a tree structure. A maximum coding unit including coding units of a tree structure may be called differently, such as a coding tree unit, a coding block tree, a block tree, a root block tree, a coding tree, a coding root, or a tree trunk. Video encoding and decoding methods based on coding units according to a tree structure will be described later with reference to FIGS. 8 through 20.

Inter prediction and interlayer prediction may be performed based on a data unit, such as a coding unit, a prediction unit, or a transformation unit.

The interlayer video encoding apparatus 10 according to various embodiments may generate symbol data by performing source coding operations including inter prediction or intra prediction on first layer images. Symbol data indicates each encoding parameter value and a sample value of a residual.

For example, the interlayer video encoding apparatus 10 may generate symbol data by performing inter or intra prediction, transformation, and quantization on samples on samples of a data unit of first layer images, and generate a first layer stream by performing entropy encoding on the symbol data.

Also, the interlayer video encoding apparatus 10 may encode second layer images based on coding units of a tree structure. The second layer encoder may generate symbol data by performing inter/intra prediction, transformation, and quantization on samples of a coding unit of second layer images, and generate a second layer stream by performing entropy encoding on the symbol data.

The second layer encoder according to various embodiments may perform interlayer prediction in which a second layer image is predicted by using prediction information of a first layer image. In order to encode a second layer original image from a second layer image sequence through an interlayer prediction structure, the second layer encoder may determine prediction information of a second layer current image by using prediction information of a first layer reconstructed image, and encode a prediction error between the second layer original image and a second layer prediction image by generating the second layer prediction image based on the determined prediction information.

The interlayer video encoding apparatus 10 may perform inter prediction according to blocks, such as coding units or prediction units, on a second layer image. In other words, a block of a first layer image to be referenced by a block of the second layer image may be determined. For example, a reconstruction block of the first layer image, which is located correspondingly to a location of a current block in the second layer image, may be determined. The interlayer video encoding apparatus 10 may determine a second layer prediction block by using a first layer reconstruction block corresponding to a second layer block.

In order to perform inter prediction, the interlayer video encoding apparatus 10 may first perform motion estimation to search reconstruction blocks reconstructed from a first layer and a second layer for a prediction block having high correlation with a second layer original block. Then, the motion information of a found prediction block may be transmitted to an interlayer video decoding apparatus 20. Here, the motion information may include reference direction information classifying a reference picture list 0 and a reference picture list 1 according to a result of the motion estimation, an index classifying a reference picture in a reference list, and a motion vector.

Meanwhile, in order to reduce a data amount related to motion information transmitted according to prediction units, the interlayer video encoding apparatus 10 may use a merge mode for setting motion information of a current block based on motion information of a spatial/temporal adjacent block or a corresponding block in an interlayer direction.

The interlayer video encoding apparatus 10 may identically form a merge candidate list for predicting motion information in an encoding apparatus and a decoding apparatus, and transmit candidate selection information in the list to the decoding apparatus to effectively reduce an amount of motion related data.

A merge candidate list may include candidates generated based on a spatial candidate based on motion information of a spatial adjacent block, a temporal candidate based on motion information of a temporal adjacent block, and an interlayer candidate based on motion information of a corresponding block in an interlayer direction. The interlayer video encoding apparatus 10 may determine whether the spatial candidate, the temporal candidate, and the interlayer candidate are usable as a merge candidate. Also, the interlayer video encoding apparatus 10 may determine whether to add the spatial candidate, the temporal candidate, the interlayer candidate, and the candidates generated based on the above candidates to the merge candidate list, according to a pre-set order.

An interlayer candidate block denotes a candidate block included in an image of a layer different from that of an image included in a current block. For example, the interlayer candidate block may include a first layer corresponding block indicated by a disparity vector of a current block from a location of a second layer current block in a first layer reconstruction image, and a right-lower block of the first layer corresponding block.

An interlayer candidate is a merge candidate usable during inter prediction of a current block, and an interlayer candidate block may not be included in a merge candidate list when a corresponding block of the current block performed intra coding, motion information of the corresponding block is not a reference picture of the same time the current block may reference.

According to an embodiment, an interlayer candidate may only allow motion information in a time direction, and in this case, the interlayer video encoding apparatus 10 may determine that a direction of inter prediction of a current block is a layer direction, and not induce merge candidate possibility information of the interlayer candidate. The merge candidate possibility information is information indicating whether a candidate is usable as a merge candidate.

For example, when brightness compensation is performed on a current block, the brightness compensation is always performed in prediction in an interlayer direction, and thus the interlayer video encoding apparatus 10 may not induce merge candidate possibility information of an interlayer candidate allowing only motion information in a time direction.

When brightness compensation is performed on a current block, the interlayer video encoding apparatus 10 does not induce merge candidate possibility information of an interlayer candidate block, thereby increasing a video coding efficiency.

The interlayer video encoding apparatus 10 may perform entropy encoding by transforming and quantizing an error, i.e., a residual according to interlayer prediction, between a sample value of a second layer prediction block and a sample value of a second layer original block, by using a first layer reconstruction image.

As described above, the interlayer video encoding apparatus 10 may encode a current layer image sequence by referencing first layer reconstruction images through an interlayer prediction structure. However, the interlayer video encoding apparatus 10 according to various embodiments may encode a second layer image sequence according to a single layer prediction structure without having to reference other layer samples. Accordingly, it should not be limitedly construed that the interlayer video encoding apparatus 10 only performs inter prediction of an interlayer prediction structure in order to encode a second layer image sequence.

Meanwhile, when the interlayer video encoding apparatus 10 encodes a multiview video, a first layer image that is encoded may be a first view video and a second layer image may be a second view video. Videos according to views may be captured by using different cameras or different lenses. Alternatively, in a 3D graphics image, videos according to views may be obtained by capturing different projection views.

Hereinafter, detailed operations of the interlayer video encoding apparatus 10 determining an enhanced inter prediction candidate list will be described with reference to FIG. 1B.

FIG. 1B is a flowchart of an interlayer video encoding method according to various embodiments.

In operation 11, the brightness compensation determiner 12 may determine whether a second layer current block performs brightness compensation.

For example, the brightness compensation determiner 12 may determine whether the current block performs brightness compensation based on a prediction mode of the current block.

Also, the brightness compensation determiner 12 may generate brightness compensation information. The brightness compensation information denotes information indicating whether the current block performs the brightness compensation. For example, the brightness compensation information may include "ic_flag". Also, the brightness compensation determiner 12 may set a value of the brightness compensation information.

For example, the brightness compensation determiner 12 may set a value of "ic_flag" to 1 when the current block performs the brightness compensation. Also, the brightness compensation determiner 12 may set the value of "ic_flag" to 0 when the current block does not perform the brightness compensation.

The interlayer video encoding apparatus 10 may encode the brightness compensation information. For example, the interlayer video encoding apparatus 10 may encode and add "ic_flag" to a bitstream.

In operation 13, the merge candidate list generator 14 may determine whether candidates of the current block are usable as a merge candidate of the current block based on whether the current block performs the brightness compensation and whether the candidates perform time direction inter prediction.

According to an embodiment, the merge candidate of the current block may include a temporal candidate, a spatial candidate, and an interlayer candidate.

According to an embodiment of the present invention, the merge candidate list generator 14 may determine the candidate of the current block. For example, the merge candidate list generator 14 may determine a first layer block corresponding to a disparity vector from a location of the second layer current block as the candidate of the current block.

Also, the merge candidate list generator 14 may determine a right-lower block of the first layer block indicated by the disparity vector from the location of the second layer current block as the candidate of the current block.

The merge candidate list generator 14 may determine a disparity vector for determining the interlayer candidate of the current block via any one of various methods.

For example, the merge candidate list generator 14 may induce the disparity vector of the current block from an adjacent block of the current block.

As another example, the merge candidate list generator 14 may detect a depth block corresponding to a first layer current block by using a disparity vector induced from an adjacent block of the second layer current block, select one of values of the depth block, and induce a disparity vector by converting the selected value to a disparity vector by using a camera parameter.

Also, when the brightness compensation is not performed on the current block, the merge candidate list generator 14 may set a vertical component of a disparity vector of the merge candidate having the disparity vector of the current block as motion information to 0.

Also, when the brightness compensation is performed on the current block, the merge candidate list generator 14 may not set the vertical component of the disparity vector of the merge candidate having the disparity vector of the current block as the motion information to 0, but may use an induced value.

According to various embodiments of the present invention, when an interlayer corresponding block of the current block performed intra coding, the interlayer candidate block may not be included in the merge candidate list.

Also, when motion information of the interlayer corresponding block of the current block is not a reference picture of a time same as a time when the current block may reference, the interlayer candidate block may not be included in the merge candidate list.

According to various embodiments of the present invention, the merge candidate list generator 14 may determine merge candidate possibility information of a certain candidate of the current block based on whether the certain candidate of the current block performs inter prediction.

For example, when the current block does not perform the brightness compensation, but the candidate of the current block performs inter prediction in a time direction, the merge candidate list generator 14 may determine a value of the merge candidate possibility information of the candidate of the current block to 1.

Also, when the current block does not perform the brightness compensation and a first layer candidate corresponding to the current block does not perform inter prediction in a time direction, the merge candidate list generator 14 may determine the value of the merge candidate possibility information of the candidate of the current block to be 0.

The merge candidate possibility information is information indicating whether the candidate of the current block is usable as a merge candidate, and may include "availableFlagIvMC (information indicating whether a candidate based on motion information of a right-lower block of a block corresponding to the disparity vector of the current block is usable as a merge candidate)" and/or "availableFlagIvMCShift (information indicating whether the candidate based on motion information of the right-lower block of the block corresponding to the disparity vector of the current block is usable)".

According to various embodiments of the present invention, the merge candidate list generator 14 may not use the candidate that performs the time direction prediction as the merge candidate when the brightness compensation is performed on the current block.

For example, when the current block performs the brightness compensation, the merge candidate list generator 14 may determine that candidates that perform time direction inter prediction from among the candidates of the current block are not usable as a merge candidate.

Also, when the second layer current block performs the brightness compensation, the merge candidate list generator 14 may not determine merge candidate possibility information of candidates that perform time direction inter prediction from among the candidates of the current block.

For example, when the second layer current block performs the brightness compensation, the merge candidate list generator 14 may not determine merge candidate possibility information of candidates that perform time direction inter prediction from among the candidates of the current block, and maintain the merge candidate possibility information of the candidate that perform time direction inter prediction from among the candidates of the current block to a pre-set value.

The pre-set value of the merge candidate possibility information of the candidates may be 0. For example, a pre-set value of each of "availableFlagIvMC" and "availableFlagIvMCShift" may be 0.

The merge candidate list generator 14 does not determine the merge candidate possibility information of the candidates, thereby increasing a video coding efficiency.

Also, when the second layer current block performs the brightness compensation, the merge candidate list generator 14 may not perform inducing processes of a merge candidate of candidates that perform time direction inter prediction from among the candidates of the current block and may not add the candidates to a merge candidate list.

For example, when the current block performs the brightness compensation, the merge candidate list generator 14 may not perform a process of inducing merge possibility information of the candidates that perform time direction inter prediction by using motion vectors of the candidates that perform time direction inter prediction from among the candidates of the current block.

In operation 15, the merge candidate list generator 14 may generate the merge candidate list including the candidate of the current block based on a result of the determining.

The merge candidate list 14 may generate the merge candidate list including at least one merge candidate based on the result of the determining. For example, the merge candidate list generator 14 may determine whether to add the candidate of the current block to the merge candidate list of the current block based on the value of the merge candidate possibility information.

For example, when the value of the merge candidate possibility information of the candidate is 1, the merge candidate list generator 14 may add the candidate of the current block to the merge candidate list of the second layer current block.

Also, when the value of the merge candidate possibility information of the candidate is 0, the merge candidate list generator 14 may not add the candidate of the current block to the merge candidate list of the second layer current block.

Also, the merge candidate list generator 14 may generate the merge candidate list by further considering whether a motion vector of a current candidate is the same as a motion vector of another candidate added to the merge candidate list.

For example, even when a value of merge candidate possibility information of the current candidate is 1, the merge candidate list generator 14 may not add the current candidate to the merge candidate list if the motion vector of the other candidate added to the merge candidate list is the same as a time direction motion vector of the current candidate.

In operation 17, the motion information determiner 16 may determine motion information of the current block by using motion information of one of the at least one merge candidate included in the merge candidate list.

The motion information determiner 16 may select one of the merge candidates included in the merge candidate list. Also, the motion information determiner 16 may set motion information of the selected merge candidate as motion information of the current block.

For example, the motion information determiner 16 may generate a second layer prediction image of each merge candidate by performing inter prediction on the second layer current block by using motion information of each merge candidate included in the merge candidate list. Also, the motion information determiner 16 may obtain an error between a second layer current original image and a second layer prediction image, and select a merge candidate in which the error is the smallest. The motion information determiner 16 may set the motion information of the selected merge candidate as the motion information of the current block.

Also, the interlayer video encoding apparatus 10 may generate the second layer prediction image by performing inter prediction on the second layer current block based on the motion information set to the current block, and encode the error between the second layer current original image and the second layer prediction image. Also, the interlayer video encoding apparatus 10 may encode a merge index indicating the selected merge candidate.

The interlayer video encoding apparatus 10 according to various embodiments may include a central processor (not shown) that generally controls the brightness compensation determiner 12, the merge candidate list generator 14, and the motion information determiner 16. Alternatively, the brightness compensation determiner 12, the merge candidate list generator 14, and the motion information determiner 16 may be operated by individual processors (not shown), and the interlayer video encoding apparatus 10 may be operated as the individual processors systematically operate. Alternatively, the brightness compensation determiner 12, the merge candidate list generator 14, and the motion information determiner 16 may be controlled according to control of an external processor (not shown) of the interlayer video encoding apparatus 10.

The interlayer video encoding apparatus 10 may include at least one data storage unit (not shown) in which input and output data of the brightness compensation determiner 12, the merge candidate list generator 14, and the motion information determiner 16 is stored. The interlayer video encoding apparatus 10 may include a memory controller (not shown) that manages data input and output of the data storage unit (not shown).

In order to output a video encoding result, the interlayer video encoding apparatus 10 may operate in cooperation with an internal video encoding processor installed therein or an external video encoding processor so as to perform video encoding operations including transformation. The internal video encoding processor of the interlayer video encoding apparatus 10 may perform the video encoding operations as a separate processor. Also, basic video encoding operations may be realized as the interlayer video encoding apparatus 10, a central processing apparatus, or a graphic processing apparatus includes a video encoding processing module.

Figure 2A:
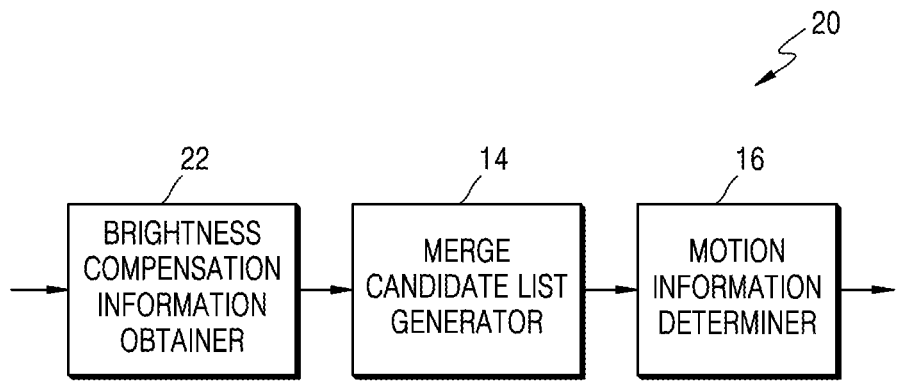
FIG. 2A is a block diagram of an interlayer video decoding apparatus according to various embodiments.

FIG. 2A is a block diagram of an interlayer video decoding apparatus according to various embodiments.

The interlayer video decoding apparatus 20 according to various embodiments may include a brightness compensation information obtainer 22, a merge candidate list generator 24, and a motion information determiner 26.

The interlayer video decoding apparatus 20 according to various embodiments may receive bitstreams according to layers, via a scalable encoding method. The number of layers of bitstreams received by the interlayer video decoding apparatus 20 is not limited. However, for convenience of description, an embodiment in which the interlayer video decoding apparatus 20 receives and decodes a first layer stream and receives and decodes a second layer stream will be described.

For example, the interlayer video decoding apparatus 20 based on spatial scalability may receive a stream in which image sequences having different resolutions are encoded in different layers. A first layer stream may be decoded to reconstruct an image sequence having low resolution and a second layer stream may be decoded to reconstruct an image sequence having high resolution.

As another example, a multiview video may be decoded according to a scalable video coding method. When a stereoscopic video stream is received in a plurality of layers, a first layer stream may be decoded to reconstruct left view images. A second layer stream may be further decoded to reconstruct right view images.

Alternatively, when a multiview video stream is received in a plurality of layers, a first layer stream may be decoded to reconstruct central view images. A second layer stream may be further decoded to reconstruct left view images. A third layer stream may be further decoded to reconstruct right view images.

As another example, a scalable video coding method based on temporal scalability may be performed. A first layer stream may be decoded to reconstruct base frame rate images. A second layer stream may be further decoded to reconstruct high frame rate images.

Also, when there are at least three second layers, first layer images may be reconstructed from a first layer stream, and when a second layer stream is further decoded by referring to first layer reconstruction images, second layer images may be further reconstructed. When K-th layer stream is further decoded by referring to second layer reconstruction images, K-th layer images may be further reconstructed.

The interlayer video decoding apparatus 20 may obtain encoded data of first layer images and second layer images from a first layer stream and a second layer stream, and in addition, may further obtain a motion vector generated via inter prediction and prediction information generated via interlayer prediction.

For example, the interlayer video decoding apparatus 20 may decode inter-predicted data per layer, and decode interlayer predicted data between a plurality of layers. Reconstruction may be performed through motion compensation and interlayer decoding based on a coding unit or a prediction unit.

Images may be reconstructed by performing motion compensation for a current image by referencing reconstruction images predicted via inter prediction of a same layer, with respect to each layer stream. Motion compensation is an operation in which a reconstruction image of a current image is reconstructed by composing a reference image determined by using a motion vector of the current image and a residual of the current image.

Also, the interlayer video decoding apparatus 20 may perform interlayer decoding by referring to prediction information of first layer images so as to decode a second layer image predicted via interlayer prediction. Interlayer decoding includes an operation in which prediction information of a current image is reconstructed by using prediction information of a reference block of a different layer so as to determine the prediction information of the current image.

The interlayer video decoding apparatus 20 according to an embodiment may perform interlayer decoding for reconstructing third layer images predicted by referencing second layer images.

However, the interlayer video decoding apparatus 20 according to various embodiments may decode a second layer stream without having to reference a first layer image sequence. Accordingly, it should not be limitedly construed that the interlayer video decoding apparatus 20 performs interlayer prediction to decode a second layer image sequence.

The interlayer video decoding apparatus 20 performs decoding according to blocks of each image of a video. A block may be, from among coding units according to a tree structure, a maximum coding unit, a coding unit, a prediction unit, or a transformation unit.

The interlayer video decoding apparatus 20 may decode a first layer image by using parsed encoding symbols of the first layer image. When the interlayer video decoding apparatus 20 receives streams encoded based on coding units of a tree structure, the interlayer video decoding apparatus 20 may perform decoding based on the coding units of the tree structure, according to a maximum coding unit of a first layer stream.

The interlayer video decoding apparatus 20 may obtain encoding information and encoded data by performing entropy decoding per maximum coding unit. The interlayer video decoding apparatus 20 may reconstruct a residual by performing inverse quantization and inverse transformation on encoded data obtained from a stream. The interlayer video decoding apparatus 20 according to another embodiment may directly receive a bitstream of quantized transformation coefficients. Residuals of images may be reconstructed by performing inverse quantization and inverse transformation on quantized transformation coefficients.

The interlayer video decoding apparatus 20 may determine a prediction image via motion compensation between same layer images, and reconstruct first layer images by combining the prediction image and a residual.

According to an interlayer prediction structure, the interlayer video decoding apparatus 20 may generate a second layer prediction image by using samples of a first layer reconstruction image. The interlayer video decoding apparatus 20 may obtain a prediction error according to interlayer prediction by decoding a second layer stream. The interlayer video decoding apparatus 20 may generate a second layer reconstruction image by combining a second layer prediction image and the prediction error.

The interlayer video decoding apparatus 20 may determine a second layer prediction image by using a decoded first layer reconstruction image. According to an interlayer prediction structure, the interlayer video decoding apparatus 20 may perform inter prediction according to blocks, such as coding units or prediction units of a second layer image. In other words, the interlayer video decoding apparatus 20 determine a block of a first layer image, which is to be referenced by a block of a second layer image. For example, a reconstruction block of a first layer image, which is located correspondingly to a location of a current block in a second layer image, may be determined. The interlayer video decoding apparatus 20 may determine a second layer prediction block by using a first layer reconstruction block corresponding to a second layer block.

Meanwhile, in order to reduce a data amount related to motion information transmitted according to prediction units, the interlayer video encoding apparatus 20 may use a merge mode for setting motion information of a current block based on motion information of a spatial/temporal adjacent block or a corresponding block in an interlayer direction.

The interlayer video encoding apparatus 20 may identically form a merge candidate list for predicting motion information in an encoding apparatus and a decoding apparatus, and transmit candidate selection information in the list to the decoding apparatus to effectively reduce an amount of motion related data.

A merge candidate list may include candidates generated based on a spatial candidate based on motion information of a spatial adjacent block, a temporal candidate based on motion information of a temporal adjacent block, and an interlayer candidate based on motion information of a corresponding block in an interlayer direction. The interlayer video encoding apparatus 20 may determine whether the spatial candidate, the temporal candidate, and the interlayer candidate are usable as a merge candidate. Also, the interlayer video encoding apparatus 20 may determine whether to add the spatial candidate, the temporal candidate, the interlayer candidate, and the candidates generated based on the above candidates to the merge candidate list, according to a pre-set order.

An interlayer candidate block denotes a candidate block included in an image of a layer different from that of an image included in a current block. For example, the interlayer candidate block may include a first layer corresponding block indicated by a disparity vector of a current block from a location of a second layer current block in a first layer reconstruction image, and a right-lower block of the first layer corresponding block.

An interlayer candidate is a merge candidate usable during inter prediction of a current block, and an interlayer candidate block may not be included in a merge candidate list when a corresponding block of the current block performed intra coding, motion information of the corresponding block is not a reference picture of the same time the current block may reference.

According to an embodiment, an interlayer candidate may only allow motion information in a time direction, and in this case, the interlayer video encoding apparatus 20 may determine that a direction of inter prediction of a current block is a layer direction, and not induce merge candidate possibility information of the interlayer candidate. The merge candidate possibility information is information indicating whether a candidate is usable as a merge candidate.

For example, when brightness compensation is performed on a current block, the brightness compensation is always performed in prediction in an interlayer direction, and thus the interlayer video encoding apparatus 10 may not induce merge candidate possibility information of an interlayer candidate allowing only motion information in a time direction.

The interlayer video decoding apparatus 20 may use a second layer prediction block determined by using a first layer reconstruction block according to an interlayer prediction structure, as a reference image for interlayer prediction of a second layer original block. The interlayer video decoding apparatus 20 may reconstruct a second layer block by composing a sample value of a second layer prediction block determined by using a first layer reconstruction image and a residual according to interlayer prediction.

According to a spatial scalable video coding method, when the interlayer video decoding apparatus 20 reconstructed a first layer image having different resolution from a second layer image, the interlayer video decoding apparatus 20 may interpolate a first layer reconstruction image so as to adjust a size of the first layer reconstruction image to same resolution as a second layer original image. The interpolated first layer reconstruction image may be determined as a second payer prediction image for interlayer prediction.

Accordingly, the interlayer video decoding apparatus 20 may reconstruct a first layer image sequence by decoding a first layer stream, and reconstruct a second layer image sequence by decoding a second layer stream.

Meanwhile, when the interlayer video decoding apparatus 20 decodes a multiview video, a first layer image that is decoded may be a first view video and a second layer image may be a second view video. Videos according to views may be captured by using different cameras or different lenses.

Figure 2B:
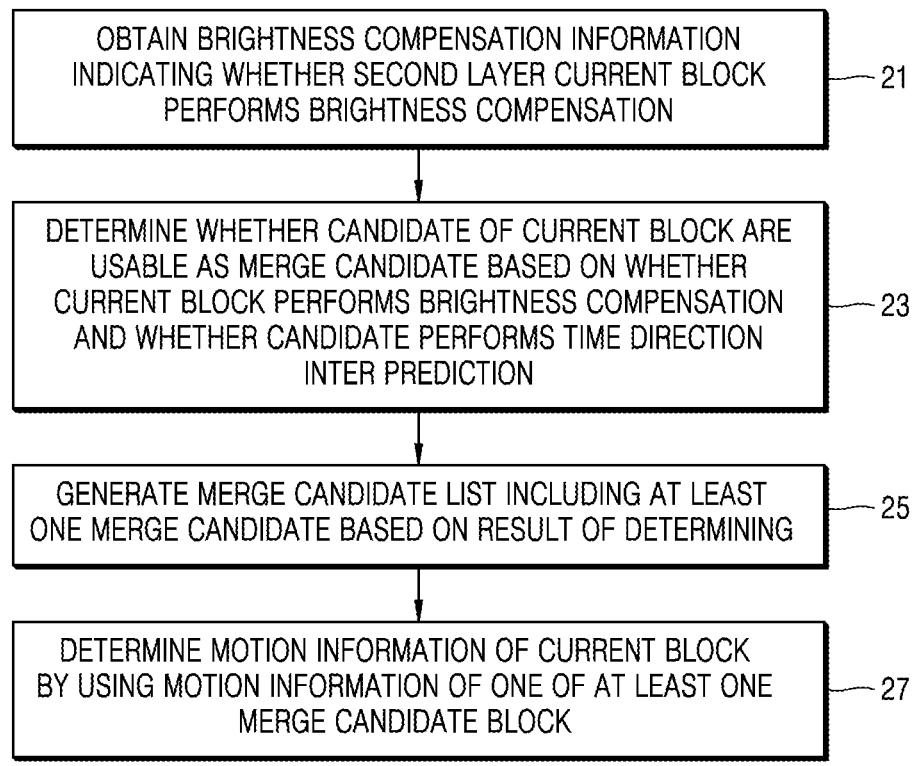
FIG. 2B is a flowchart of an interlayer video decoding method according to various embodiments.

FIG. 2B is a flowchart of an interlayer video decoding method according to various embodiments.

In operation 21, the brightness compensation information obtainer 22 may obtain brightness compensation information indicating whether a second layer current block performs brightness compensation.

For example, the brightness compensation information obtainer 22 may obtain the brightness compensation information from a bitstream. For example, the brightness compensation information obtainer 22 may obtain "ic_flag" from the bitstream.

In operation 23, the merge candidate list generator 24 may determine whether candidates of the current block are usable as a merge candidate based on whether the brightness compensation information indicates performance of the brightness compensation and whether the candidates of the current block perform time direction inter prediction.

According to an embodiment, the merge candidate of the current block may include a temporal candidate, a spatial candidate, and an interlayer candidate.

According to an embodiment of the present invention, the merge candidate list generator 24 may determine the candidate of the current block. For example, the merge candidate list generator 24 may determine a first layer block corresponding to a disparity vector from a location of the second layer current block as the candidate of the current block.

Also, the merge candidate list generator 24 may determine a right-lower block of the first layer block indicated by the disparity vector from the location of the second layer current block as the candidate of the current block.

The merge candidate list generator 24 may determine a disparity vector for determining the interlayer candidate of the current block via any one of various methods.

For example, the merge candidate list generator 24 may induce the disparity vector of the current block from an adjacent block of the current block.

As another example, the merge candidate list generator 24 may detect a depth block corresponding to a first layer current block by using a disparity vector induced from an adjacent block of the second layer current block, select one of values of the depth block, and induce a disparity vector by converting the selected value to a disparity vector by using a camera parameter.

Also, when the brightness compensation is not performed on the current block, the merge candidate list generator 24 may set a vertical component of a disparity vector of the merge candidate having the disparity vector of the current block as motion information to 0.

Also, when the brightness compensation is performed on the current block, the merge candidate list generator 24 may not set the vertical component of the disparity vector of the merge candidate having the disparity vector of the current block as the motion information to 0, but may use an induced value.

According to various embodiments of the present invention, when an interlayer corresponding block of the current block performed intra coding, the interlayer candidate block may not be included in the merge candidate list.

Also, when motion information of the interlayer corresponding block of the current block is not a reference picture of a time same as a time when the current block may reference, the interlayer candidate block may not be included in the merge candidate list.

According to various embodiments of the present invention, the merge candidate list generator 24 may determine merge candidate possibility information of a certain candidate of the current block based on whether the certain candidate of the current block performs inter prediction.

For example, when the current block does not perform the brightness compensation, but the candidate of the current block performs inter prediction in a time direction, the merge candidate list generator 24 may determine a value of the merge candidate possibility information of the candidate of the current block to 1.

Also, when the current block does not perform the brightness compensation and a first layer candidate corresponding to the current block does not perform inter prediction in a time direction, the merge candidate list generator 24 may determine the value of the merge candidate possibility information of the candidate of the current block to be 0.

The merge candidate possibility information is information indicating whether the candidate of the current block is usable as a merge candidate, and may include "availableFlagIvMC (information indicating whether a candidate based on motion information of a right-lower block of a block corresponding to the disparity vector of the current block is usable as a merge candidate)" and/or "availableFlagIvMCShift (information indicating whether the candidate based on motion information of the right-lower block of the block corresponding to the disparity vector of the current block is usable)".

According to various embodiments of the present invention, the merge candidate list generator 24 may not use the candidate that performs the time direction prediction as the merge candidate when the brightness compensation is performed on the current block.

For example, when the current block performs the brightness compensation, the merge candidate list generator 24 may determine that candidates that perform time direction inter prediction from among the candidates of the current block are not usable as a merge candidate.

Also, when the second layer current block performs the brightness compensation, the merge candidate list generator 24 may not determine merge candidate possibility information of candidates that perform time direction inter prediction from among the candidates of the current block.

For example, when the second layer current block performs the brightness compensation, the merge candidate list generator 24 may not determine merge candidate possibility information of candidates that perform time direction inter prediction from among the candidates of the current block, and maintain the merge candidate possibility information of the candidate that perform time direction inter prediction from among the candidates of the current block to a pre-set value.

The pre-set value of the merge candidate possibility information of the candidates may be 0. For example, a pre-set value of each of "availableFlagIvMC" and "availableFlagIvMCShift" may be 0.

The merge candidate list generator 24 does not determine the merge candidate possibility information of the candidates, thereby increasing a video coding efficiency.

Also, when the second layer current block performs the brightness compensation, the merge candidate list generator 24 may not perform inducing processes of a merge candidate of candidates that perform time direction inter prediction from among the candidates of the current block and may not add the candidates to a merge candidate list.

For example, when the current block performs the brightness compensation, the merge candidate list generator 24 may not perform a process of inducing merge possibility information of the candidates that perform time direction inter prediction by using motion vectors of the candidates that perform time direction inter prediction from among the candidates of the current block.

In operation 25, the merge candidate list generator 24 may generate the merge candidate list including the candidate of the current block based on a result of the determining.

The merge candidate list 24 may generate the merge candidate list including at least one merge candidate based on the result of the determining. For example, the merge candidate list generator 24 may determine whether to add the candidate of the current block to the merge candidate list of the current block based on the value of the merge candidate possibility information.

For example, when the value of the merge candidate possibility information of the candidate is 1, the merge candidate list generator 24 may add the candidate of the current block to the merge candidate list of the second layer current block.

Also, when the value of the merge candidate possibility information of the candidate is 0, the merge candidate list generator 24 may not add the candidate of the current block to the merge candidate list of the second layer current block.

Also, the merge candidate list generator 24 may generate the merge candidate list by further considering whether a motion vector of a current candidate is the same as a motion vector of another candidate added to the merge candidate list.

For example, even when a value of merge candidate possibility information of the current candidate is 1, the merge candidate list generator 24 may not add the current candidate to the merge candidate list if the motion vector of the other candidate added to the merge candidate list is the same as a time direction motion vector of the current candidate.

In operation 27, the motion information determiner 26 may determine motion information of the current block by using motion information of one of the at least one merge candidate included in the merge candidate list.

The motion information determiner 26 may select one of the merge candidates included in the merge candidate list. Also, the motion information determiner 26 may set motion information of the selected merge candidate as motion information of the current block.

For example, the motion information determiner 26 may generate a second layer prediction image of each merge candidate by performing inter prediction on the second layer current block by using motion information of each merge candidate included in the merge candidate list. Also, the motion information determiner 16 may obtain an error between a second layer current original image and a second layer prediction image, and select a merge candidate in which the error is the smallest. The motion information determiner 26 may set the motion information of the selected merge candidate as the motion information of the current block.

Also, the interlayer video decoding apparatus 20 may generate the second layer prediction image by performing inter prediction on the second layer current block based on the motion information set to the current block, and reconstruct the current block by composing residual data obtained from the bitstream and a sample value of the prediction image.

The interlayer video decoding apparatus 20 according to various embodiments may include at least one data storage unit (not shown) in which input and output data of the brightness compensation information obtainer 22, the merge candidate list generator 24, and the motion information determiner 26 is stored. The interlayer video decoding apparatus 20 may include a memory controller (not shown) that manages data input and output of the data storage unit (not shown).

In order to reconstruct a video via video decoding, the interlayer video decoding apparatus 20 according to various embodiments may operate in cooperation with an internal video encoding processor installed therein or an external video encoding processor so as to perform video decoding operations including transformation. The internal video encoding processor of the interlayer video decoding apparatus 20 according to various embodiments may be a separate processor, or alternatively, the interlayer video decoding apparatus 20, a central processing apparatus, or a graphic processing apparatus may include a video decoding processing module to perform basic video decoding operations.

FIG. 3 is a flowchart for describing a method of determining, by the interlayer video decoding apparatus 20 according to various embodiments, merge candidate possibility information based on whether a current block performs brightness compensation.

The interlayer video decoding apparatus 20 may set merge candidate possibility information of an interlayer candidate of a current block to 0. The interlayer candidate is a candidate included in an image of a layer different from a layer of an image including the current block. For example, the interlayer candidate may include a first layer block indicated by a disparity vector of the current block from a second layer current block in a first layer image, and a right-lower block of the first layer block.

In operation 31, the interlayer video decoding apparatus 20 may set a value of "availableFlagIvMC" to 1. "availableFlagIvMC" indicates merge candidate possibility information of a first layer candidate indicated by the disparity vector of the current block from the location of the second layer current block.

In operation 32, the interlayer video decoding apparatus 20 may determine whether a value of obtained brightness compensation information is 0. For example, the interlayer video decoding apparatus 20 may determine whether a value of obtained "ic_flag" is 0.

In operation 33, when the value of the obtained brightness compensation information is 0, the interlayer video decoding apparatus 20 may induce a value of "availableFlagIvMC". The interlayer video decoding apparatus 20 may induce the value of "availableFlagIvMC" based on whether the first layer candidate indicated by the disparity vector of the current block from the location of the second layer current block performed time direction prediction. Also, the induced value may be determined as the value of "availableFlagIvMC".

For example, the interlayer video decoding apparatus 20 may induce the value of "availableFlagIvMC" to 1 when the first layer block indicated by the disparity vector of the current block from the location of the second layer current block performs time direction prediction. Also, the induced value may be determined as the value of "availableFlagIvMC".

Referring to operation 34, when the value of the obtained brightness compensation information is not 0, the interlayer video decoding apparatus 20 may not induce the value of "availableFlagIvMC". For example, when the value of "ic_flag" is 1, the interlayer video decoding apparatus 20 may not induce the value of "availableFlagIvMC" but maintain the value of "availableFlagIvMC" to 0 that is pre-set.

Also, when the value of obtained "ic_flag" is 1, the interlayer video deoding apparatus 20 may determine whether to add various types of candidates to the merge candidate list by considering motion information in time direction of the first layer candidate corresponding to the current block.

For example, when a motion vector of a spatial candidate of the second layer current block and a motion vector of the first layer candidate corresponding to the second layer current block are the same, the merge candidate list generator 24 may not add the spatial candidate to the merge candidate list.

Also, when a reference index of a spatial candidate of the second layer current block and a reference index of the first layer candidate corresponding to the second layer current block are the same, the merge candidate list generator 24 may not add the spatial candidate to the merge candidate list irrelevantly to whether the motion vector of the spatial candidate and the motion vector in the time direction of the first layer candidate are the same.

Processes from operations 31 through 23 may be identically applied to a right-lower candidate of the first layer candidate indicated by the disparity vector from the location of the second layer current block in the first layer image. In this case, merge candidate possibility information of the right-lower candidate of the first layer candidate may be indicated by "availableFlagIvMCShift".

Figure 4:
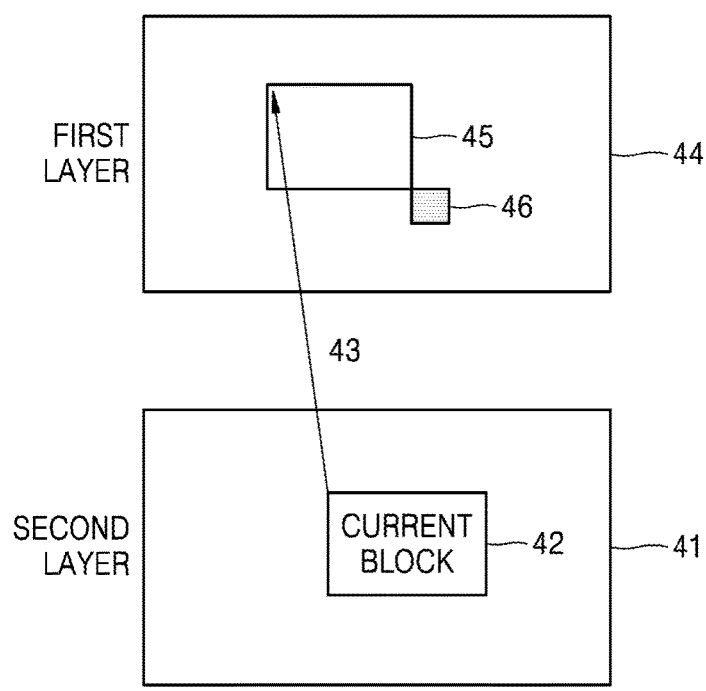
FIG. 4 is a diagram for describing an example of a first layer candidate block corresponding to a second layer current block, according to various embodiments.

FIG. 4 is a diagram for describing an example of a first layer candidate block corresponding to a second layer current block, according to various embodiments.

The interlayer video encoding apparatus 10 may use a merge mode that uses correlation of motion information between an adjacent block and a current block.

When the interlayer video encoding apparatus 10 uses a merge mode, the interlayer video encoding apparatus 10 may identically form a merge candidate list for inducing motion information in an encoding apparatus and a decoding apparatus and transmit candidate selection information in the list to the decoding apparatus, thereby effectively reducing an amount of motion-related data.

The interlayer video encoding apparatus 10 may add an interlayer candidate block to the merge candidate list for inter prediction. The interlayer candidate block is a candidate block included in an image of a layer different from a layer of an image including the current block.

Referring to FIG. 4, the interlayer candidate block may include a block 45 indicated by a disparity vector 43 of a current block from a location of the current block 42 included in a second layer picture 41.

Also, the interlayer candidate block may include a right lower block 46 of the block 45 indicated by the disparity vector 43 of the current block from the location of the current block 42 included in the second layer picture 41.

The interlayer candidate described above is only an embodiment of the present invention. The interlayer candidate block may include various blocks included in an image of a layer different from the layer of the image including the current block, in addition to the blocks described above.

Figure 5:
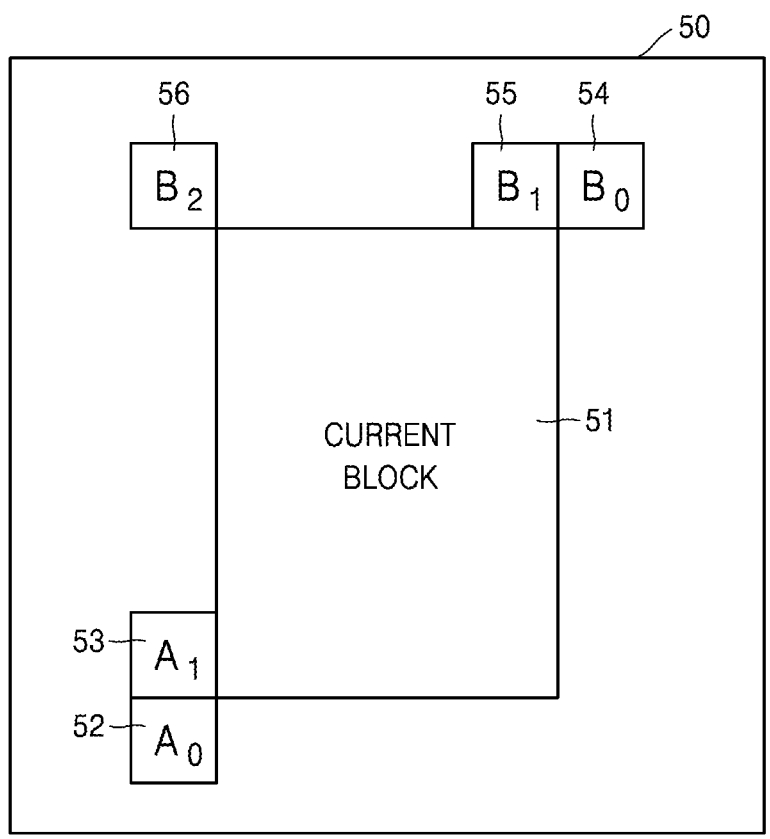
FIG. 5 illustrates a spatial candidate block of a current block according to various embodiments.

FIG. 5 illustrates a spatial candidate block of a current block according to various embodiments.

Referring to FIG. 5, candidate blocks to be referenced to predict motion information of a current block 51 from a current picture 50 may be prediction units spatially adjacent to the current block 51.

For example, an adjacent block A0 52 located outside the left bottom of a left bottom sample of the current block 51, an adjacent block A1 53 located outside the left of the left bottom sample of the current block 51, an adjacent block B0 54 located outside the right top of a right top sample of the current block 51, an adjacent block B1 55 neighboring outside the top of the right top sample of the current block 51, and an adjacent block B2 56 located outside the left top of a left top sample of the current block 51 may be spatial candidate blocks of the current block 51.

The interlayer video decoding apparatus 20 may determine whether to add the spatial candidate blocks to the merge candidate list. For example, the interlayer video decoding apparatus 20 may determine whether to add the spatial candidate blocks to the merge candidate list in consideration of whether the current block 51 performs brightness compensation and motion information in time direction of a first layer candidate block corresponding to the current block 51.

For example, when the interlayer video decoding apparatus 20 determined that the brightness compensation is performed on the second layer current block 51 and a time direction motion vector of the A0 52 that is one of the spatial candidate blocks of the second layer current block 51 and a time direction motion vector of the first layer candidate block corresponding to the second layer current block 51 are the same, the merge candidate list generator 24 may not add the A0 52 to the merge candidate list.

Also, when the interlayer video decoding apparatus 20 determined that the brightness compensation is performed on the second layer current block 51 and a reference index of the A0 52 that is one of the spatial candidate blocks of the second layer current block 51 and a reference index of the first layer candidate block corresponding to the second layer current block 51 are the same, the interlayer video decoding apparatus 20 may not add the A0 52 to the merge candidate list irrelevantly to whether the motion vector of the A0 52 and the time direction motion vector of the first layer candidate block are the same.

Figure 6:
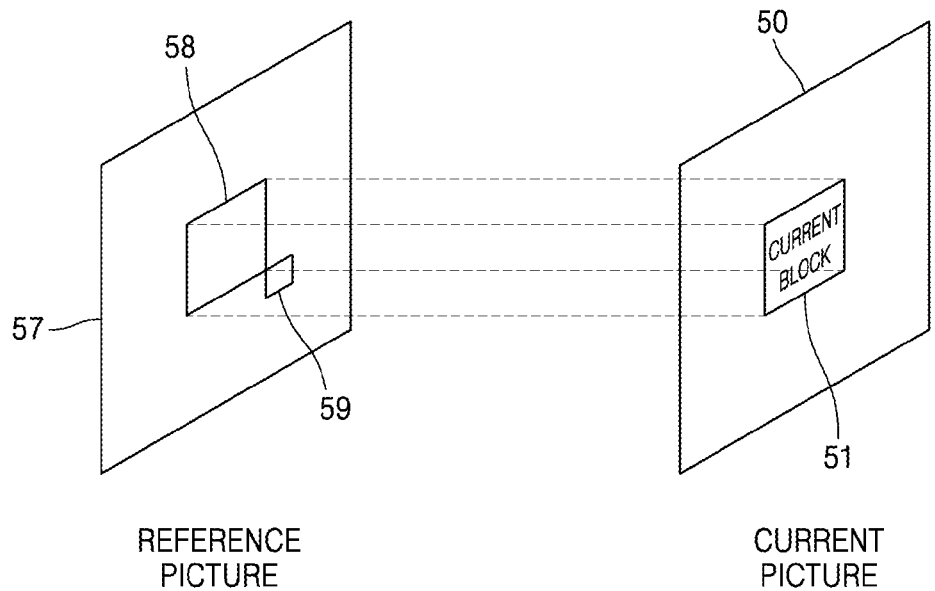
FIG. 6 illustrates a temporal prediction candidate used in an inter prediction mode, according to an embodiment.

FIG. 6 illustrates a temporal prediction candidate used in an inter prediction mode, according to an embodiment.

Referring to FIG. 6, for inter prediction of the current block 51 included in the current picture 50, a co-located block 59 of the current block 51, which is included in a reference picture 57, and at least one of adjacent blocks of the co-located block 59 may be included in a temporal prediction candidate. For example, the right lower block 59 of the co-located block 54 may be included in the temporal prediction candidate. Meanwhile, a block used to determine the temporal prediction candidate may be a coding unit or a prediction unit.

The interlayer video decoding apparatus 20 may determine whether to add the temporal candidate blocks to the merge candidate list. For example, the interlayer video decoding apparatus 20 may determine whether to add the temporal candidate blocks to the merge candidate list in consideration of whether the current block 51 performs brightness compensation and motion information in time direction of a first layer candidate block corresponding to the current block 51.

For example, when the interlayer video decoding apparatus 20 determined that the brightness compensation is performed on the second layer current block 51 and a time direction motion vector of a co-located block that is one of the temporal candidate blocks of the second layer current block 51 and a time direction motion vector of the first layer candidate block corresponding to the second layer current block 51 are the same, the interlayer video decoding apparatus 20 may not add the co-located block to the merge candidate list.

Also, when the interlayer video decoding apparatus 20 determined that the brightness compensation is performed on the second layer current block 51 and a reference index of a co-located block that is one of the temporal candidate blocks of the second layer current block 51 and a reference index of the first layer candidate block corresponding to the second layer current block 51 are the same, the interlayer video decoding apparatus 20 may not add the co-located block to the merge candidate list irrelevantly to whether the motion vector of the co-located block and the time direction motion vector of the first layer candidate block are the same.

Figure 7:
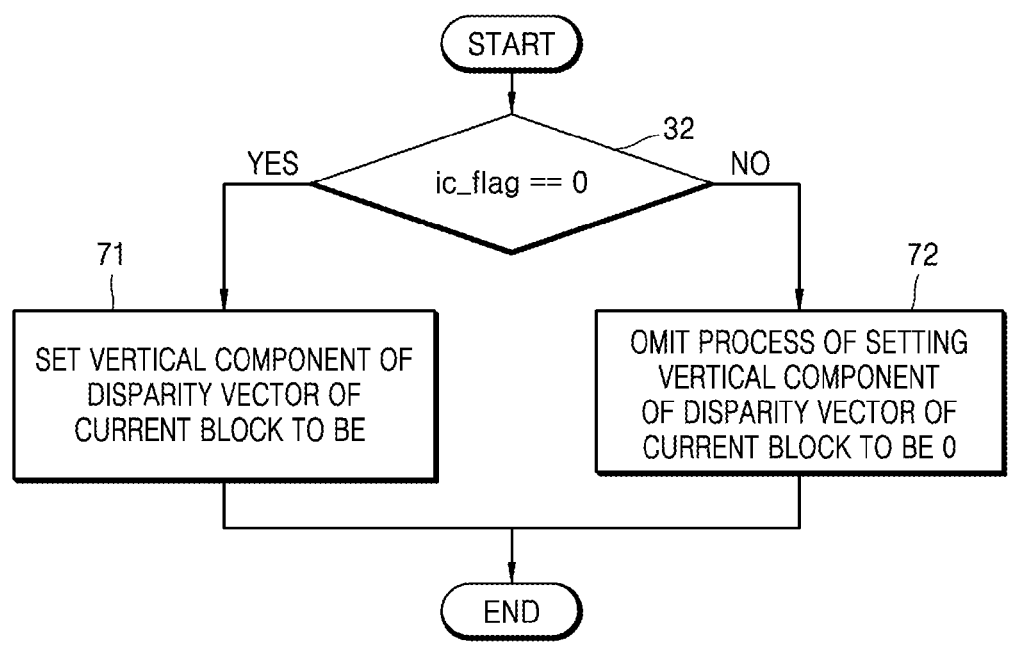
FIG. 7 is a flowchart for describing a method of not setting a vertical component of a disparity vector to be 0 based on whether a current block performs brightness compensation, according to various embodiments.

FIG. 7 is a flowchart for describing a method of not setting a vertical component of a disparity vector to 0 based on whether a current block performs brightness compensation, according to various embodiments.

The interlayer video decoding apparatus 20 may determine an interlayer candidate block. For example, the merge candidate list generator 24 may determine a first layer block indicated by a disparity vector from a location of a second layer current block as the interlayer candidate block corresponding to the current block.

The interlayer video decoding apparatus 20 may determine the disparity vector required to determine the interlayer candidate block based on whether the current block performs brightness compensation.

For example, referring to operation 71 of FIG. 7, when obtained ic_flag is 0, the interlayer video decoding apparatus 20 may set a vertical component of the disparity vector of the current block to 0.

Also, referring to operation 72 of FIG. 7, when the obtained ic_flag is 0, the interlayer video decoding apparatus 20 may not set the vertical component of the disparity vector of the current block to 0. Meanwhile, the operations described above with reference to FIGS. 3 through 7 are performed by the interlayer video decoding apparatus 20, but it would be obvious to one of ordinary skill in the art that the operations may also be performed by the interlayer video encoding apparatus 10.

As described above, the interlayer video encoding apparatus 10 according to an embodiment and the interlayer video decoding apparatus 20 according to an embodiment may spilt blocks of video data into coding units having a tree structure, and coding units, prediction units, and transformation units may be used for interlayer prediction or inter prediction of coding units. Hereinafter, a video encoding method, a video encoding apparatus, a video decoding method, and a video decoding apparatus based on coding units having a tree structure and transformation units, according to an embodiment, will be described with reference to FIGS. 8 through 20.

In principle, during encoding and decoding processes for a multilayer video, encoding and decoding processes for first layer images and encoding and decoding processes for second layer images are separately performed. In other words, when interlayer prediction is performed on a multilayer video, encoding and decoding results of single-layer videos may be mutually referred to, but separate encoding and decoding processes are performed according to single-layer videos.

Accordingly, since video encoding and decoding processes based on coding units having a tree structure as described below with reference to FIGS. 8 through 20 for convenience of description are video encoding and decoding processes for processing a single-layer video, only inter prediction and motion compensation are performed. However, as described above with reference to FIGS. 1A through 7, in order to encode and decode a video stream, interlayer prediction and compensation are performed on base layer images and second layer images.

Figure 8:
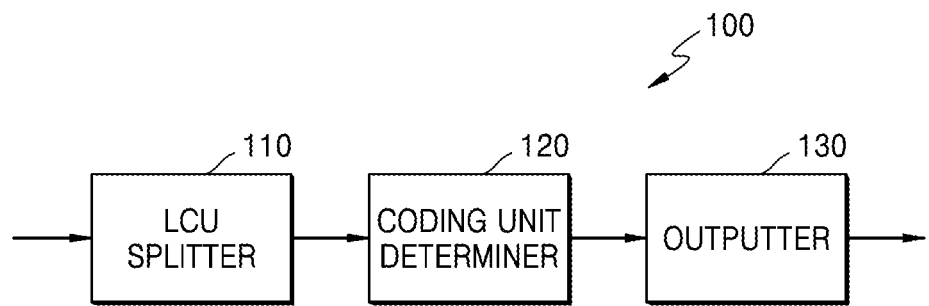
FIG. 8 is a block diagram of a video encoding apparatus based on coding units according to a tree structure, according to an embodiment.

Accordingly, in order for an encoder of the interlayer video encoding apparatus 10 according to an embodiment to encode a multilayer video based on coding units having a tree structure, the interlayer video encoding apparatus 10 may include as many video encoding apparatuses 100 of FIG. 8 as the number of layers of the multilayer video so as to perform video encoding according to each single-layer video, thereby controlling each video encoding apparatus 100 to encode an assigned single-layer video. Also, the interlayer video encoding apparatus 10 may perform interview prediction by using encoding results of individual single viewpoints of each video encoding apparatus 100. Accordingly, the encoder of the interlayer video encoding apparatus 10 may generate a base view video stream and a second layer video stream, which include encoding results according to layers.

Figure 9:
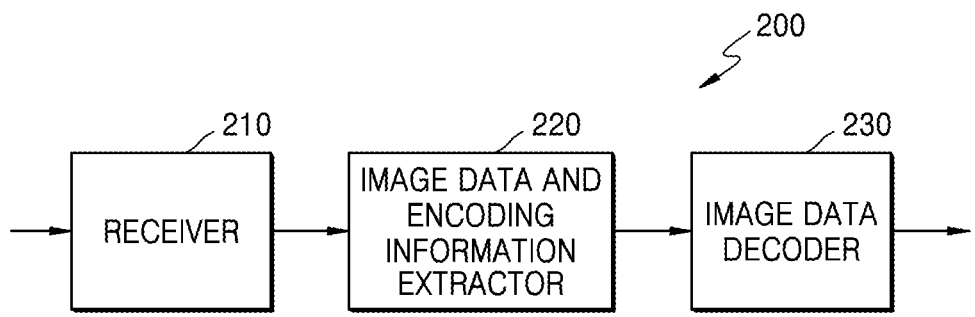
FIG. 9 is a block diagram of a video decoding apparatus based on coding units according to a tree structure, according to an embodiment.

Similarly, in order for a decoder of the interlayer video decoding apparatus 20 according to an embodiment to decode a multilayer video based on coding units having a tree structure, the interlayer video decoding apparatus 20 may include as many video decoding apparatuses 200 of FIG. 9 as the number of layers of the multilayer video so as to perform video decoding according to layers with respect to a received first layer video stream and a received second layer video stream, thereby controlling each video decoding apparatus 200 to decode an assigned single-layer video. Also, the interlayer video decoding apparatus 200 may perform interlayer compensation by using a decoding result of an individual single layer of each video decoding apparatus 200. Accordingly, the decoder of the interlayer video decoding apparatus 20 may generate first layer images and second layer images, which are reconstructed according to layers.

FIG. 8 is a block diagram of the video encoding apparatus 100 based on coding units according to a tree structure, according to an embodiment of the present invention.

The video encoding apparatus 100 according to an embodiment involving video prediction based on coding units according to a tree structure includes a coding unit determiner 120 and an output unit 130. Hereinafter, for convenience of description, the video encoding apparatus 10 according to an embodiment involving video prediction based on coding units according to a tree structure will be abbreviated to the 'video encoding apparatus 100'.

The coding unit determiner 120 may split a current picture based on a maximum coding unit that is a coding unit having a maximum size for a current picture of an image. If the current picture is larger than the maximum coding unit, image data of the current picture may be split into the at least one maximum coding unit. The maximum coding unit according to an embodiment may be a data unit having a size of 32×32, 64×64, 128×128, 256×256, etc., wherein a shape of the data unit is a square having a width and length in squares of 2.

A coding unit according to an embodiment may be characterized by a maximum size and a depth. The depth denotes the number of times the coding unit is spatially split from the maximum coding unit, and as the depth deepens, deeper coding units according to depths may be split from the maximum coding unit to a minimum coding unit. A depth of the maximum coding unit is an uppermost depth and a depth of the minimum coding unit is a lowermost depth. Since a size of a coding unit corresponding to each depth decreases as the depth of the maximum coding unit deepens, a coding unit corresponding to an upper depth may include a plurality of coding units corresponding to lower depths.

As described above, the image data of the current picture is split into the maximum coding units according to a maximum size of the coding unit, and each of the maximum coding units may include deeper coding units that are split according to depths. Since the maximum coding unit according to an embodiment is split according to depths, the image data of a spatial domain included in the maximum coding unit may be hierarchically classified according to depths.

A maximum depth and a maximum size of a coding unit, which limit the total number of times a height and a width of the maximum coding unit are hierarchically split, may be predetermined.

The coding unit determiner 120 encodes at least one split region obtained by splitting a region of the maximum coding unit according to depths, and determines a depth to output a finally encoded image data according to the at least one split region. In other words, the coding unit determiner 120 determines a final depth by encoding the image data in the deeper coding units according to depths, according to the maximum coding unit of the current picture, and selecting a depth having the least encoding error. The determined final depth and the encoded image data according to the determined coded depth are output to the output unit 130.

The image data in the maximum coding unit is encoded based on the deeper coding units corresponding to at least one depth equal to or below the maximum depth, and results of encoding the image data are compared based on each of the deeper coding units. A depth having the least encoding error may be selected after comparing encoding errors of the deeper coding units. At least one final depth may be selected for each maximum coding unit.

The size of the maximum coding unit is split as a coding unit is hierarchically split according to depths, and as the number of coding units increases. Also, even if coding units correspond to the same depth in one maximum coding unit, it is determined whether to split each of the coding units corresponding to the same depth to a lower depth by measuring an encoding error of the image data of the each coding unit, separately. Accordingly, even when image data is included in one maximum coding unit, the encoding errors may differ according to regions in the one maximum coding unit, and thus the final depths may differ according to regions in the image data. Thus, one or more final depths may be determined in one maximum coding unit, and the image data of the maximum coding unit may be divided according to coding units of at least one final depth.

Accordingly, the coding unit determiner 120 according to an embodiment may determine coding units having a tree structure included in the maximum coding unit. The 'coding units having a tree structure' according to an embodiment include coding units corresponding to a depth determined to be the final depth, from among all deeper coding units included in the maximum coding unit. A coding unit of a final depth may be hierarchically determined according to depths in the same region of the maximum coding unit, and may be independently determined in different regions. Similarly, a final depth in a current region may be independently determined from a final depth in another region.

A maximum depth according to an embodiment is an index related to the number of splitting times from a maximum coding unit to a minimum coding unit. A first maximum depth according to an embodiment may denote the total number of splitting times from the maximum coding unit to the minimum coding unit. A second maximum depth according to an embodiment may denote the total number of depth levels from the maximum coding unit to the minimum coding unit. For example, when a depth of the maximum coding unit is 0, a depth of a coding unit, in which the maximum coding unit is split once, may be set to 1, and a depth of a coding unit, in which the maximum coding unit is split twice, may be set to 2. Here, if the minimum coding unit is a coding unit in which the maximum coding unit is split four times, depth levels of depths 0, 1, 2, 3, and 4 exist, and thus the first maximum depth may be set to 4, and the second maximum depth may be set to 5.

Prediction encoding and transformation may be performed according to the maximum coding unit. The prediction encoding and the transformation are also performed based on the deeper coding units according to a depth equal to or depths less than the maximum depth, according to the maximum coding unit.

Since the number of deeper coding units increases whenever the maximum coding unit is split according to depths, encoding, including the prediction encoding and the transformation, is performed on all of the deeper coding units generated as the depth deepens. For convenience of description, the prediction encoding and the transformation will now be described based on a coding unit of a current depth, in a maximum coding unit.

The video encoding apparatus 100 according to an embodiment may variously select a size or shape of a data unit for encoding the image data. In order to encode the image data, operations, such as prediction encoding, transformation, and entropy encoding, are performed, and at this time, the same data unit may be used for all operations or different data units may be used for each operation.

For example, the video encoding apparatus 100 may select not only a coding unit for encoding the image data, but also a data unit different from the coding unit so as to perform the prediction encoding on the image data in the coding unit.

In order to perform prediction encoding in the maximum coding unit, the prediction encoding may be performed based on a coding unit corresponding to a final depth according to an embodiment, i.e., based on a coding unit that is no longer split to coding units corresponding to a lower depth. Hereinafter, the coding unit that is no longer split and becomes a basis unit for prediction encoding will now be referred to as a 'prediction unit'. A partition obtained by splitting the prediction unit may include a prediction unit or a data unit obtained by splitting at least one of a height and a width of the prediction unit. A partition is a data unit where a prediction unit of a coding unit is split, and a prediction unit may be a partition having the same size as a coding unit.

For example, when a coding unit of 2N×2N (where N is a positive integer) is no longer split and becomes a prediction unit of 2N×2N, and a size of a partition may be 2N×2N, 2N×N, N×2N, or N×N. Examples of a partition mode according to an embodiment include symmetrical partitions that are obtained by symmetrically splitting a height or width of the prediction unit, partitions obtained by asymmetrically splitting the height or width of the prediction unit, such as 1:n or n:1, partitions that are obtained by geometrically splitting the prediction unit, and partitions having arbitrary shapes.

A prediction mode of the prediction unit may be at least one of an intra mode, a inter mode, and a skip mode. For example, the intra mode or the inter mode may be performed on the partition of 2N×2N, 2N×N, N×2N, or N×N. Also, the skip mode may be performed only on the partition of 2N×2N. The encoding is independently performed on one prediction unit in a coding unit, thereby selecting a prediction mode having a least encoding error.

The video encoding apparatus 100 according to an embodiment may also perform the transformation on the image data in a coding unit based not only on the coding unit for encoding the image data, but also based on a data unit that is different from the coding unit. In order to perform the transformation in the coding unit, the transformation may be performed based on a transformation unit having a size smaller than or equal to the coding unit. For example, the transformation unit may include a data unit for an intra mode and a transformation unit for an inter mode.

The transformation unit in the coding unit may be recursively split into smaller sized regions in a manner similar to that in which the coding unit is split according to the tree structure, according to an embodiment. Thus, residual data in the coding unit may be split according to the transformation unit having the tree structure according to transformation depths.

A transformation depth indicating the number of splitting times to reach the transformation unit by splitting the height and width of the coding unit may also be set in the transformation unit according to an embodiment. For example, in a current coding unit of 2N×2N, a transformation depth may be 0 when the size of a transformation unit is 2N×2N, may be 1 when the size of the transformation unit is N×N, and may be 2 when the size of the transformation unit is N/2×N/2. In other words, the transformation unit having the tree structure may be set according to the transformation depths.

Split information according to depths requires not only information about a depth, but also about information related to prediction encoding and transformation. Accordingly, the coding unit determiner 120 not only determines a depth having a least encoding error, but also determines a partition mode of splitting a prediction unit into a partition, a prediction mode according to prediction units, and a size of a transformation unit for transformation.

Coding units according to a tree structure in a maximum coding unit and methods of determining a prediction unit/partition, and a transformation unit, according to an embodiment, will be described in detail later with reference to FIGS. 9 through 19.

The coding unit determiner 120 may measure an encoding error of deeper coding units according to depths by using Rate-Distortion Optimization based on Lagrangian multipliers.

The output unit 130 outputs the image data of the maximum coding unit, which is encoded based on the at least one depth determined by the coding unit determiner 120, and split information according to the depth, in bitstreams.

The encoded image data may be obtained by encoding residual data of an image.

The split information according to depth may include information about the depth, about the partition mode in the prediction unit, about the prediction mode, and about split of the transformation unit.

The information about the final depth may be defined by using split information according to depths, which indicates whether encoding is performed on coding units of a lower depth instead of a current depth. If the current depth of the current coding unit is a depth, the current coding unit is encoded, and thus the split information may be defined not to split the current coding unit to a lower depth. Alternatively, if the current depth of the current coding unit is not the depth, the encoding is performed on the coding unit of the lower depth, and thus the split information may be defined to split the current coding unit to obtain the coding units of the lower depth.

If the current depth is not the depth, encoding is performed on the coding unit that is split into the coding unit of the lower depth. Since at least one coding unit of the lower depth exists in one coding unit of the current depth, the encoding is repeatedly performed on each coding unit of the lower depth, and thus the encoding may be recursively performed for the coding units having the same depth.

Since the coding units having a tree structure are determined for one maximum coding unit, and split information is determined for a coding unit of a depth, at least one piece of split information may be determined for one maximum coding unit. Also, a depth of the image data of the maximum coding unit may be different according to locations since the image data is hierarchically split according to depths, and thus a depth and split information may be set for the image data.

Accordingly, the output unit 130 according to an embodiment may assign a corresponding depth and encoding information about an encoding mode to at least one of the coding unit, the prediction unit, and a minimum unit included in the maximum coding unit.

The minimum unit according to an embodiment is a square data unit obtained by splitting the minimum coding unit constituting the lowermost depth by 4. Alternatively, the minimum unit according to an embodiment may be a maximum square data unit that may be included in all of the coding units, prediction units, partition units, and transformation units included in the maximum coding unit.

For example, the encoding information output by the output unit 130 may be classified into encoding information according to deeper coding units, and encoding information according to prediction units. The encoding information according to the deeper coding units may include the information about the prediction mode and about the size of the partitions. The encoding information according to the prediction units may include information about an estimated direction of an inter mode, about a reference image index of the inter mode, about a motion vector, about a chroma component of an intra mode, and about an interpolation method of the intra mode.

Information about a maximum size of the coding unit defined according to pictures, slices, or GOPs, and information about a maximum depth may be inserted into a header of a bitstream, a sequence parameter set, or a picture parameter set.

Information about a maximum size of the transformation unit permitted with respect to a current video, and information about a minimum size of the transformation unit may also be output through a header of a bitstream, a sequence parameter set, or a picture parameter set. The output unit 130 may encode and output reference information related to prediction, prediction information, and slice type information.

In the video encoding apparatus 100 according to the simplest embodiment, the deeper coding unit may be a coding unit obtained by dividing a height or width of a coding unit of an upper depth, which is one layer above, by two. In other words, when the size of the coding unit of the current depth is 2N×2N, the size of the coding unit of the lower depth is N×N. Also, the coding unit with the current depth having a size of 2N×2N may include a maximum of 4 of the coding units with the lower depth.

Accordingly, the video encoding apparatus 100 may form the coding units having the tree structure by determining coding units having an optimum shape and an optimum size for each maximum coding unit, based on the size of the maximum coding unit and the maximum depth determined considering characteristics of the current picture. Also, since encoding may be performed on each maximum coding unit by using any one of various prediction modes and transformations, an optimum encoding mode may be determined considering characteristics of the coding unit of various image sizes.

Thus, if an image having a high resolution or a large data amount is encoded in a conventional macroblock, the number of macroblocks per picture excessively increases. Accordingly, the number of pieces of compressed information generated for each macroblock increases, and thus it is difficult to transmit the compressed information and data compression efficiency decreases. However, by using the video encoding apparatus 100 according to an embodiment, image compression efficiency may be increased since a coding unit is adjusted while considering characteristics of an image while increasing a maximum size of a coding unit while considering a size of the image.

The interlayer video encoding apparatus 10 described above with reference to FIG. 1A may include as many video encoding apparatuses 100 as the number of layers, in order to encode single-layer images according to layers of a multilayer video. For example, the first layer encoder may include one video encoding apparatus 100 and the second layer encoder may include as many video encoding apparatuses 100 as the number of second layers.

When the video encoding apparatus 100 encodes first layer images, the coding unit determiner 120 may determine, for each maximum coding unit, a prediction unit for inter-prediction according to coding units having a tree structure, and perform inter-prediction according to prediction units.

Even when the video encoding apparatus 100 encodes second layer images, the coding unit determiner 120 may determine, for each maximum coding unit, coding units and prediction units having a tree structure, and perform inter-prediction according to prediction units.

The video encoding apparatus 100 may encode a luminance difference to compensate for a luminance difference between a first layer image and a second layer image. However, whether to perform luminance may be determined according to an encoding mode of a coding unit. For example, luminance compensation may be performed only on a prediction unit having a size of 2N×2N.

FIG. 9 is a block diagram of the video decoding apparatus 200 based on coding units according to a tree structure, according to various embodiments of the present invention.

The video decoding apparatus 200 according to an embodiment that involves video prediction based on coding units having a tree structure includes a receiver 210, an image data and encoding information extractor 220, and an image data decoder 230. For convenience of description, the video decoding apparatus 200 according to an embodiment that involves video prediction based on coding units having a tree structure will be abbreviated to the 'video decoding apparatus 200'.

Definitions of various terms, such as a coding unit, a depth, a prediction unit, a transformation unit, and various split information, for decoding operations of the video decoding apparatus 200 according to an embodiment are identical to those described with reference to FIG. 8 and the video encoding apparatus 100.

The receiver 210 receives and parses a bitstream of an encoded video. The image data and encoding information extractor 220 extracts encoded image data for each coding unit from the parsed bitstream, wherein the coding units have a tree structure according to each maximum coding unit, and outputs the extracted image data to the image data decoder 230. The image data and encoding information extractor 220 may extract information about a maximum size of a coding unit of a current picture, from a header about the current picture, a sequence parameter set, or a picture parameter set.

Also, the image data and encoding information extractor 220 extracts a final depth and split information for the coding units having a tree structure according to each maximum coding unit, from the parsed bitstream. The extracted final depth and split information are output to the image data decoder 230. In other words, the image data in a bit stream is split into the maximum coding unit so that the image data decoder 230 decodes the image data for each maximum coding unit.

A depth and split information according to the maximum coding unit may be set for at least one piece of depth information, and split information may include information about a partition mode of a corresponding coding unit, about a prediction mode, and about split of a transformation unit. Also, split information according to depths may be extracted as the information about a depth.

The depth and the split information according to each maximum coding unit extracted by the image data and encoding information extractor 220 is a depth and split information determined to generate a minimum encoding error when an encoder, such as the video encoding apparatus 100 according to an embodiment, repeatedly performs encoding for each deeper coding unit according to depths according to each maximum coding unit. Accordingly, the video decoding apparatus 200 may reconstruct an image by decoding the image data according to a coded depth and an encoding mode that generates the minimum encoding error.

Since encoding information according to an embodiment about a depth and an encoding mode may be assigned to a predetermined data unit from among a corresponding coding unit, a prediction unit, and a minimum unit, the image data and encoding information extractor 220 may extract the depth and the split information according to the predetermined data units. If the depth and the split information of a corresponding maximum coding unit is recorded according to predetermined data units, the predetermined data units to which the same depth and the same split information is assigned may be inferred to be the data units included in the same maximum coding unit.

The image data decoder 230 may reconstruct the current picture by decoding the image data in each maximum coding unit based on the depth and the split information according to the maximum coding units. In other words, the image data decoder 230 may decode the encoded image data based on the extracted information about the partition mode, the prediction mode, and the transformation unit for each coding unit from among the coding units having the tree structure included in each maximum coding unit. A decoding process may include a prediction including intra prediction and motion compensation, and an inverse transformation.

The image data decoder 230 may perform intra prediction or motion compensation according to a partition and a prediction mode of each coding unit, based on the information about the partition mode and the prediction mode of the prediction unit of the coding unit according to depths.

In addition, the image data decoder 230 may read information about a transformation unit according to a tree structure for each coding unit so as to perform inverse transformation based on transformation units for each coding unit, for inverse transformation for each maximum coding unit. Via the inverse transformation, a pixel value of a spatial region of the coding unit may be reconstructed.

The image data decoder 230 may determine a depth of a current maximum coding unit by using split information according to depths. If the split information indicates that image data is no longer split in the current depth, the current depth is a depth. Accordingly, the image data decoder 230 may decode encoded data in the current maximum coding unit by using the information about the partition mode of the prediction unit, the prediction mode, and the size of the transformation unit.

In other words, data units containing the encoding information including the same split information may be gathered by observing the encoding information set assigned for the predetermined data unit from among the coding unit, the prediction unit, and the minimum unit, and the gathered data units may be considered to be one data unit to be decoded by the image data decoder 230 in the same encoding mode. As such, the current coding unit may be decoded by obtaining the information about the encoding mode for each coding unit.

The interlayer video decoding apparatus 20 described above with reference to FIG. 2A may include the number of video decoding apparatuses 200 as much as the number of viewpoints, so as to reconstruct first layer images and second layer images by decoding a received first layer image stream and a received second layer image stream.

When the first layer image stream is received, the image data decoder 230 of the video decoding apparatus 200 may split samples of first layer images extracted from the first layer image stream by the image data and encoding information extractor 220 into coding units having a tree structure. The image data decoder 230 may reconstruct the first layer images by performing motion compensation according to prediction units for inter prediction, on the coding units having the tree structure obtained by splitting the samples of the first layer images.

When the second layer image stream is received, the image data decoder 230 of the video decoding apparatus 200 may split samples of second layer images extracted from the second layer image stream by the image data and encoding information extractor 220 into coding units having a tree structure. The image data decoder 230 may reconstruct the second layer images by performing motion compensation according to prediction units for inter prediction, on the coding units obtained by splitting the samples of the second layer images.

The extractor 220 may obtain information related to a luminance error from a bitstream so as to compensate for a luminance difference between a first layer image and a second layer image. However, whether to perform luminance may be determined according to an encoding mode of a coding unit. For example, luminance compensation may be performed only on a prediction unit having a size of 2N×2N.

Thus, the video decoding apparatus 200 may obtain information about at least one coding unit that generates the minimum encoding error when encoding is recursively performed for each maximum coding unit, and may use the information to decode the current picture. In other words, the coding units having the tree structure determined to be the optimum coding units in each maximum coding unit may be decoded.

Accordingly, even if image data has high resolution and a large amount of data, the image data may be efficiently decoded and reconstructed by using a size of a coding unit and an encoding mode, which are adaptively determined according to characteristics of the image data, by using optimum split information received from an encoder.

Figure 10:
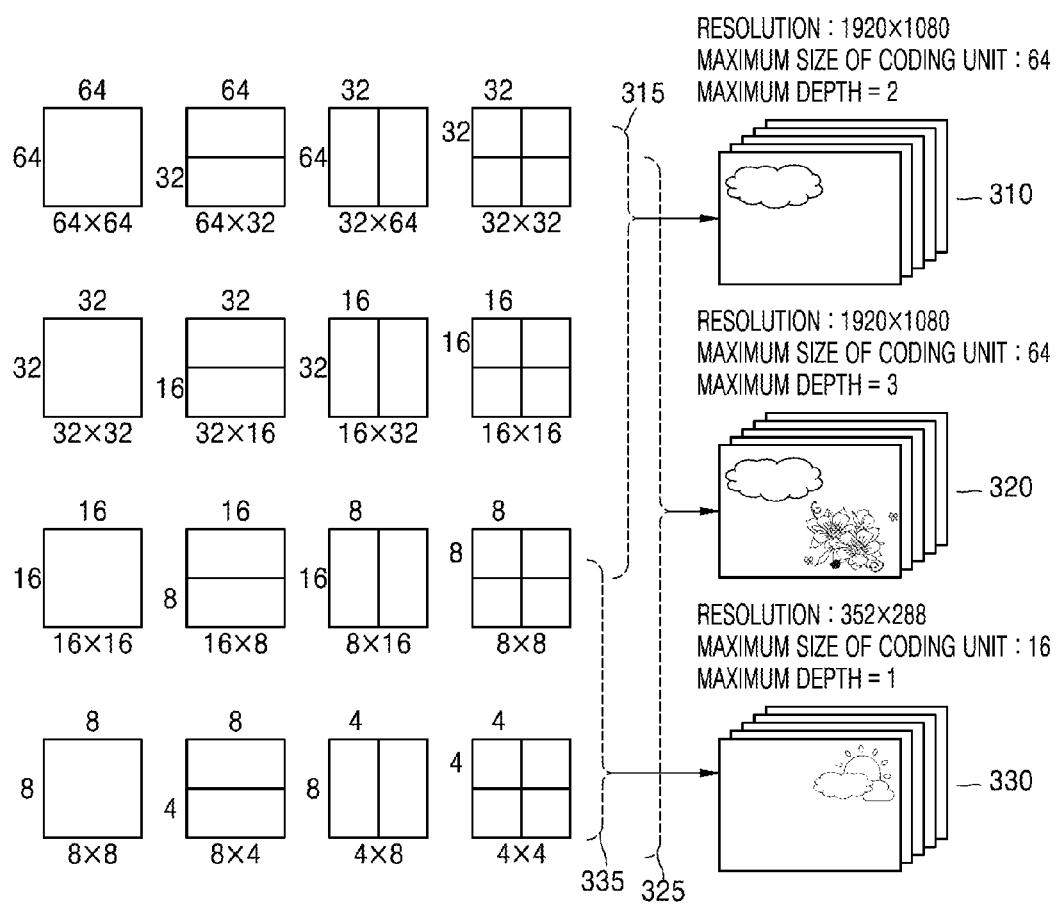
FIG. 10 is a diagram for describing a concept of coding units according to an embodiment.

FIG. 10 is a diagram for describing a concept of coding units according to various embodiments.

A size of a coding unit may be expressed by width×height, and may be 64×64, 32×32, 16×16, and 8×8. A coding unit of 64×64 may be split into partitions of 64×64, 64×32, 32×64, or 32×32, and a coding unit of 32×32 may be split into partitions of 32×32, 32×16, 16×32, or 16×16, a coding unit of 16×16 may be split into partitions of 16×16, 16×8, 8×16, or 8×8, and a coding unit of 8×8 may be split into partitions of 8×8, 8×4, 4×8, or 4×4.

In video data 310, a resolution is 1920×1080, a maximum size of a coding unit is 64, and a maximum depth is 2. In video data 320, a resolution is 1920×1080, a maximum size of a coding unit is 64, and a maximum depth is 3. In video data 330, a resolution is 352×288, a maximum size of a coding unit is 16, and a maximum depth is 1. The maximum depth shown in FIG. 10 denotes a total number of splits from a maximum coding unit to a minimum decoding unit.

If a resolution is high or a data amount is large, a maximum size of a coding unit may be large so as to not only increase encoding efficiency but also to accurately reflect characteristics of an image. Accordingly, the maximum size of the coding unit of the video data 310 and 320 having a higher resolution than the video data 330 may be 64.

Since the maximum depth of the video data 310 is 2, coding units 315 of the vide data 310 may include a maximum coding unit having a long axis size of 64, and coding units having long axis sizes of 32 and 16 since depths are deepened to two layers by splitting the maximum coding unit twice. Since the maximum depth of the video data 330 is 1, coding units 335 of the video data 330 may include a maximum coding unit having a long axis size of 16, and coding units having a long axis size of 8 since depths are deepened to one layer by splitting the maximum coding unit once.

Since the maximum depth of the video data 320 is 3, coding units 325 of the video data 320 may include a maximum coding unit having a long axis size of 64, and coding units having long axis sizes of 32, 16, and 8 since the depths are deepened to 3 layers by splitting the maximum coding unit three times. As a depth deepens, detailed information may be precisely expressed.

Figure 11:
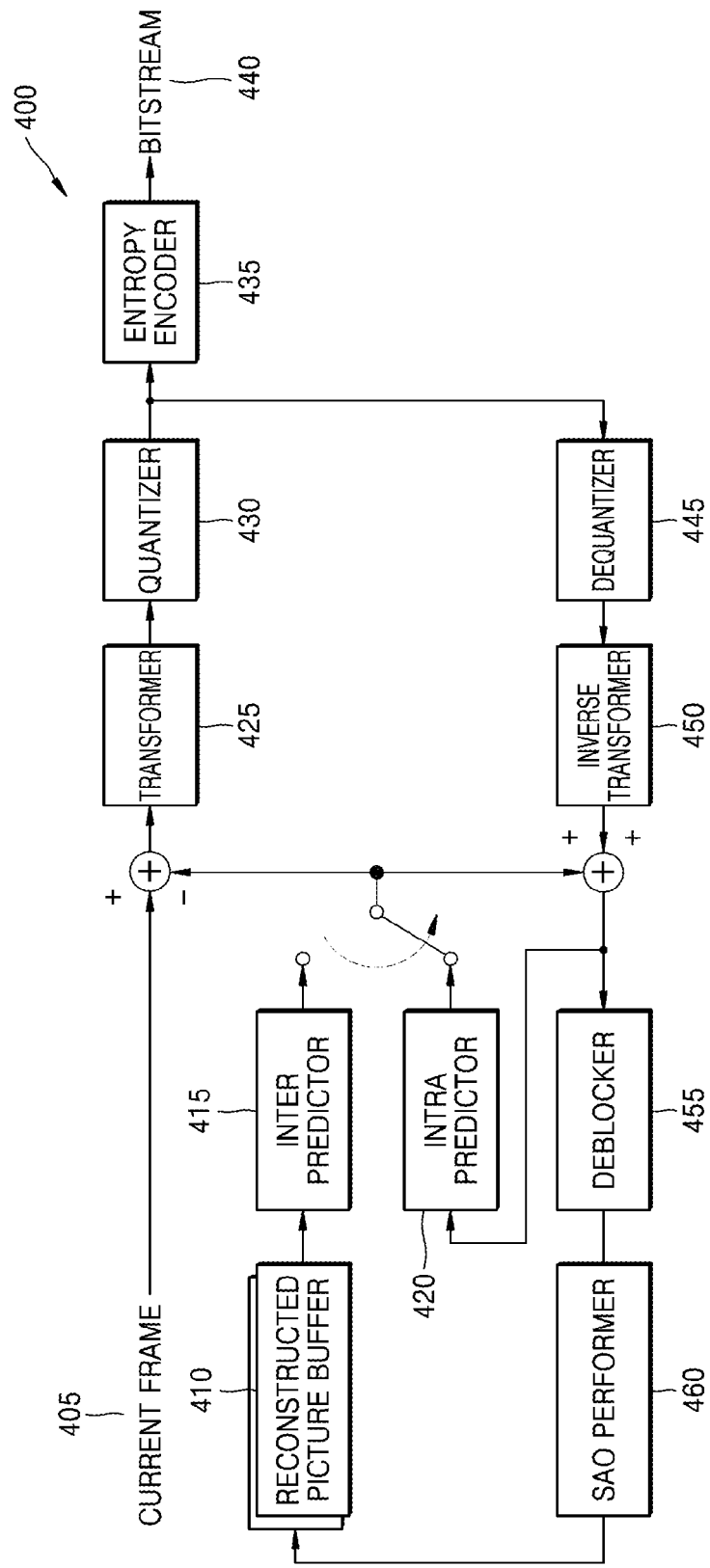
FIG. 11 is a block diagram of an image encoder based on coding units, according to an embodiment.

FIG. 11 is a block diagram of an image encoder 400 based on coding units, according to various embodiments.

The image encoder 400 according to an embodiment performs operations of the coding unit determiner 120 of the video encoding apparatus 100 to encode image data. In other words, an intra predictor 420 performs intra prediction on coding units in an intra mode, from among a current frame 405, per prediction unit, and an inter predictor 415 performs inter prediction on coding units in an inter mode by using the current image 405 and a reference image obtained by a restored picture buffer 410, per prediction unit. The current picture 405 may be split into maximum coding units, and then the maximum coding units may be sequentially encoded. Here, the encoding may be performed on coding units split in a tree structure from the maximum coding unit.

Residual data is generated by subtracting prediction data of a coding unit of each mode output from the intra predictor 420 or the inter predictor 415 from data of the current image 405 to be encoded, and the residual data is output as a quantized transformation coefficient through a transformer 425 and a quantizer 430 per transformation unit. The quantized transformation coefficient is restored to residual data in a spatial domain through an inverse quantizer 445 and an inverse transformer 450. The residual data in the spatial domain is added to the prediction data of the coding unit of each mode output from the intra predictor 420 or the inter predictor 415 to be restored as data in a spatial domain of the coding unit of the current image 405. The data in the spatial domain passes through a deblocking unit 455 and a sample adaptive offset (SAO) performer 460 and thus a restored image is generated. The restored image is stored in the restored picture buffer 410. Restored images stored in the restored picture buffer 410 may be used as a reference image for inter prediction of another image. The quantized transformation coefficient obtained through the transformer 425 and the quantizer 430 may be output as a bitstream 440 through an entropy encoder 435.

In order for the image encoder 400 according to an embodiment to be applied in the video encoding apparatus 100, components of the image encoder 400, i.e., the inter predictor 415, the intra predictor 420, the transformer 425, the quantizer 430, the entropy encoder 435, the inverse quantizer 445, the inverse transformer 450, the deblocking unit 455, and the SAO performer 460 perform operations based on each coding unit among coding units having a tree structure per maximum coding unit.

Specifically, the intra predictor 420 and the inter predictor 415 determine partitions and a prediction mode of each coding unit from among the coding units having a tree structure while considering the maximum size and the maximum depth of a current maximum coding unit, and the transformer 425 may determine whether to split a transformation unit according to a quad-tree in each coding unit from among the coding units having the tree structure.

Figure 12:
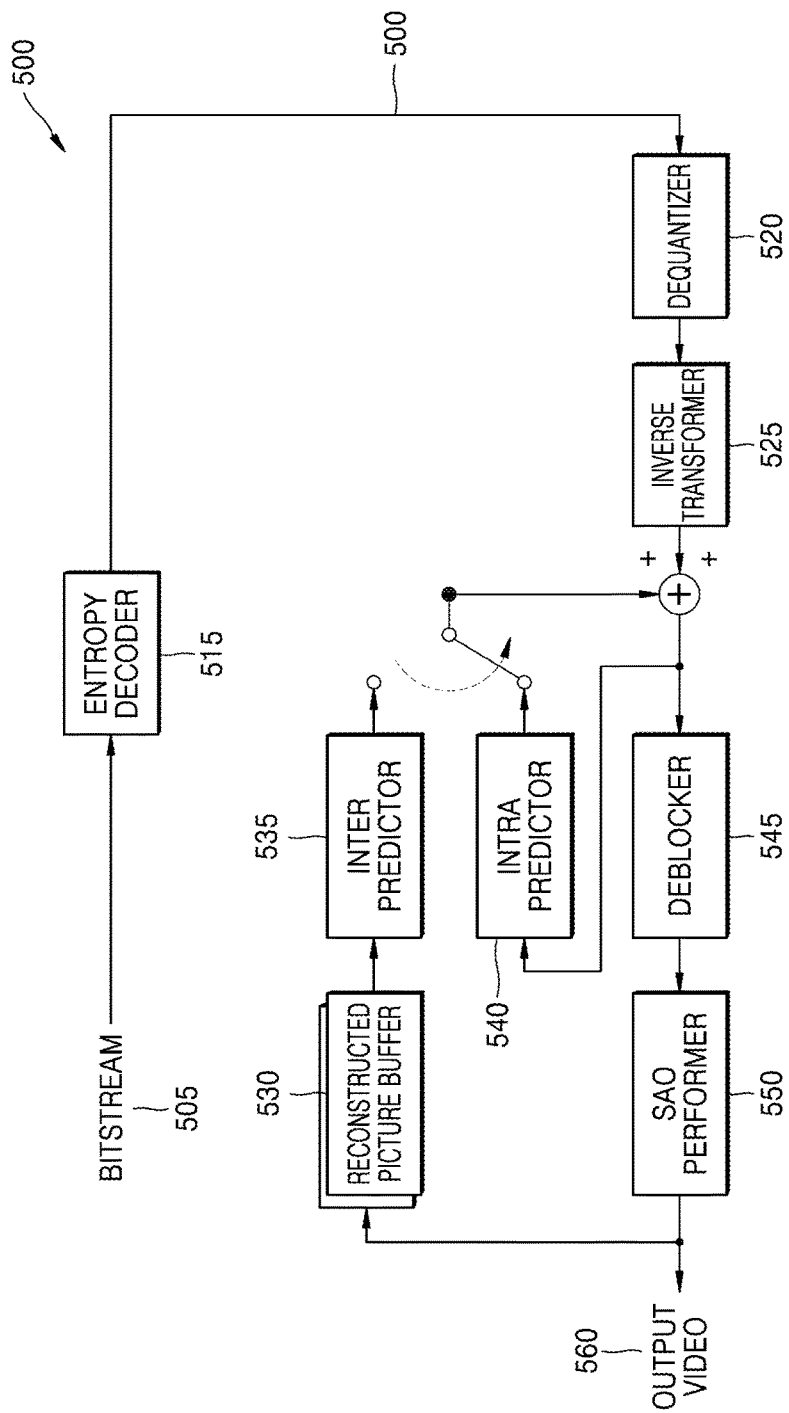
FIG. 12 is a block diagram of an image decoder based on coding units, according to an embodiment.

FIG. 12 is a block diagram of an image decoder 500 based on coding units according to various embodiments.

An entropy decoder 515 parses encoded image data that is to be decoded and encoding information required for decoding from a bitstream 505. The encoded image data is a quantized transformation coefficient, and an inverse quantizer 520 and an inverse transformer 525 restores residual data from the quantized transformation coefficient.

An intra predictor 540 performs intra prediction on a coding unit in an intra mode according to prediction units. An inter predictor performs inter prediction on a coding unit in an inter mode from a current image according to prediction units, by using a reference image obtained by a restored picture buffer 530.

Data in a spatial domain of coding units of the current image is restored by adding the residual data and the prediction data of a coding unit of each mode through the intra predictor and the inter predictor 535, and the data in the spatial domain may be output as a restored image through a deblocking unit 545 and an SAO performer 550. Also, restored images stored in the restored picture buffer 530 may be output as reference images.

In order to decode the image data in the image data decoder 230 of the video decoding apparatus 200, operations after the entropy decoder 515 of the image decoder 500 according to an embodiment may be performed.

In order for the image decoder 500 to be applied in the video decoding apparatus 200 according to an embodiment, components of the image decoder 500, i.e., the entropy decoder 515, the inverse quantizer 520, the inverse transformer 525, the intra predictor 540, the inter predictor 535, the deblocking unit 545, and the SAO performer 550 may perform operations based on coding units having a tree structure for each maximum coding unit.

Specifically, the intra prediction 540 and the inter predictor 535 determine a partition mode and a prediction mode according to each of coding units having a tree structure, and the inverse transformer 525 may determine whether to split a transformation unit according to a quad-tree structure per coding unit.

An encoding operation of FIG. 10 and a decoding operation of FIG. 11 are respectively a video stream encoding operation and a video stream decoding operation in a single layer. Accordingly, when the encoder of FIG. 1A encodes a video stream of at least two layers, the video encoding apparatus 100 of FIG. 1A may include as many image encoder 400 as the number of layers. Similarly, when the decoder 26 of FIG. 2A decodes a video stream of at least two layers, the video decoding apparatus 200 of FIG. 2A may include as many image decoders 500 as the number of layers.

Figure 13:
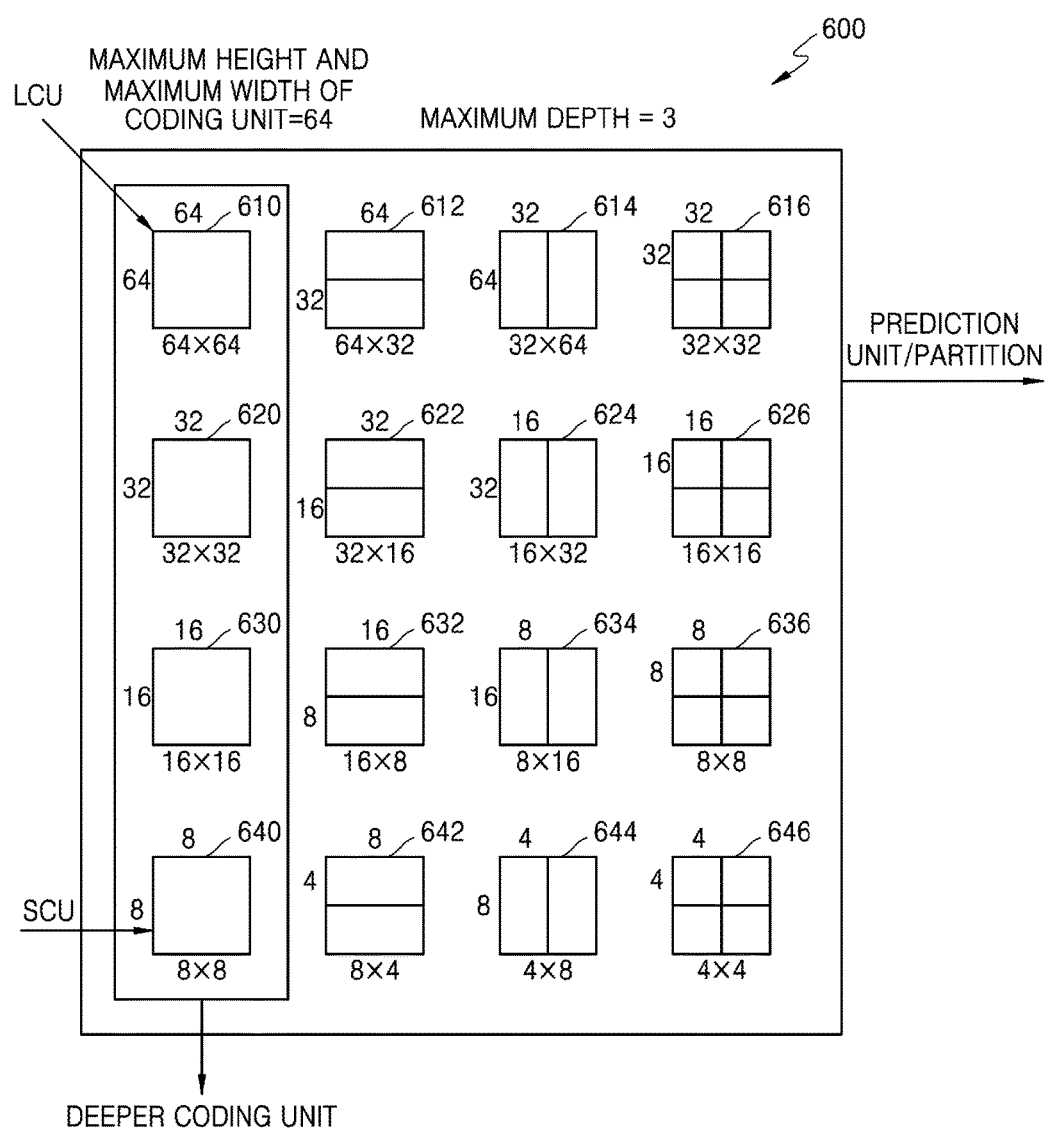
FIG. 13 is a diagram illustrating coding units and partitions, according to an embodiment.

FIG. 13 is a diagram illustrating coding units and partitions, according to various embodiments of the present invention.

The video encoding apparatus 100 according to an embodiment and the video decoding apparatus 200 according to an embodiment use hierarchical coding units so as to consider characteristics of an image. A maximum height, a maximum width, and a maximum depth of coding units may be adaptively determined according to the characteristics of the image, or may be differently set by a user. Sizes of deeper coding units according to depths may be determined according to the predetermined maximum size of the coding unit.

In a hierarchical structure 600 of coding units according to an embodiment, the maximum height and the maximum width of the coding units are each 64, and the maximum depth is 3. In this case, the maximum depth refers to a total number of times the coding unit is split from the maximum coding unit to the minimum coding unit. Since a depth deepens along a vertical axis of the hierarchical structure 600 of coding units according to an embodiment, a height and a width of the deeper coding unit are each split. Also, a prediction unit and partitions, which are bases for prediction encoding of each deeper coding unit, are shown along a horizontal axis of the hierarchical structure 600.

In other words, a coding unit 610 is a maximum coding unit in the hierarchical structure 600, wherein a depth is 0 and a size, i.e., a height by width, is 64×64. The depth deepens along the vertical axis, and a coding unit 620 having a size of 32×32 and a depth of 1, a coding unit 630 having a size of 16×16 and a depth of 2, and a coding unit 640 having a size of 8×8 and a depth of 3. The coding unit 640 having a size of 8×8 and a depth of 3 is a minimum coding unit.

The prediction unit and the partitions of a coding unit are arranged along the horizontal axis according to each depth. In other words, if the coding unit 610 having a size of 64×64 and a depth of 0 is a prediction unit, the prediction unit may be split into partitions include in the encoding unit 610, i.e. a partition 610 having a size of 64×64, partitions 612 having the size of 64×32, partitions 614 having the size of 32×64, or partitions 616 having the size of 32×32.

Similarly, a prediction unit of the coding unit 620 having the size of 32×32 and the depth of 1 may be split into partitions included in the coding unit 620, i.e. a partition 620 having a size of 32×32, partitions 622 having a size of 32×16, partitions 624 having a size of 16×32, and partitions 626 having a size of 16×16.

Similarly, a prediction unit of the coding unit 630 having the size of 16×16 and the depth of 2 may be split into partitions included in the coding unit 630, i.e. a partition having a size of 16×16 included in the coding unit 630, partitions 632 having a size of 16×8, partitions 634 having a size of 8×16, and partitions 636 having a size of 8×8.

Similarly, a prediction unit of the coding unit 640 having the size of 8×8 and the depth of 3 may be split into partitions included in the coding unit 640, i.e. a partition having a size of 8×8 included in the coding unit 640, partitions 642 having a size of 8×4, partitions 644 having a size of 4×8, and partitions 646 having a size of 4×4.

In order to determine the depth of the maximum coding unit 610, the coding unit determiner 120 of the video encoding apparatus 100 according to an embodiment performs encoding for coding units corresponding to each depth included in the maximum coding unit 610.

A number of deeper coding units according to depths including data in the same range and the same size increases as the depth deepens. For example, four coding units corresponding to a depth of 2 are required to cover data that is included in one coding unit corresponding to a depth of 1. Accordingly, in order to compare encoding results of the same data according to depths, the coding unit corresponding to the depth of 1 and four coding units corresponding to the depth of 2 are each encoded.

In order to perform encoding for a current depth from among the depths, a least encoding error may be selected for the current depth by performing encoding for each prediction unit in the coding units corresponding to the current depth, along the horizontal axis of the hierarchical structure 600. Alternatively, the minimum encoding error may be searched for by comparing the least encoding errors according to depths, by performing encoding for each depth as the depth deepens along the vertical axis of the hierarchical structure 600. A depth and a partition having the minimum encoding error in the maximum coding unit 610 may be selected as the depth and a partition mode of the maximum coding unit 610.

Figure 14:
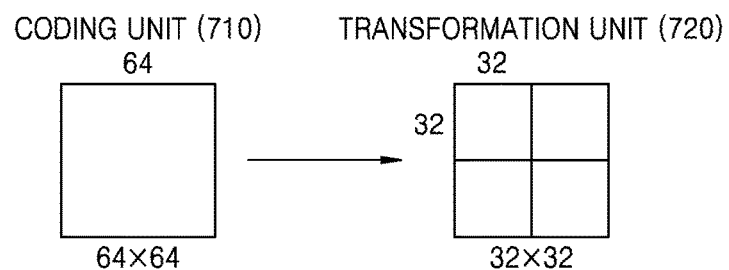
FIG. 14 is a diagram for describing a relationship between a coding unit and transformation units, according to an embodiment.

FIG. 14 is a diagram for describing a relationship between a coding unit and transformation units, according to various embodiments.

The video encoding apparatus 100 according to an embodiment or the video decoding apparatus 200 according to an embodiment encodes or decodes an image according to coding units having sizes smaller than or equal to a maximum coding unit for each maximum coding unit. Sizes of transformation units for transformation during encoding may be selected based on data units that are not larger than a corresponding coding unit.

For example, in the video encoding apparatus 100 according to an embodiment or the video decoding apparatus 200 according to an embodiment, if a size of a coding unit 710 is 64×64, transformation may be performed by using a transformation units 720 having a size of 32×32.

Also, data of the coding unit 710 having the size of 64×64 may be encoded by performing the transformation on each of the transformation units having the size of 32×32, 16×16, 8×8, and 4×4, which are smaller than 64×64, and then a transformation unit having the least coding error may be selected.

FIG. 15 is a diagram for describing encoding information according to various embodiments.

The output unit 130 of the video encoding apparatus 100 according to an embodiment may encode and transmit information 800 about a partition mode, information 810 about a prediction mode, and information 820 about a size of a transformation unit for each coding unit corresponding to a depth, as split information.

The information 800 indicates information about a shape of a partition obtained by splitting a prediction unit of a current coding unit, wherein the partition is a data unit for prediction encoding the current coding unit. For example, a current coding unit CU_0 having a size of 2N×2N may be split into any one of a partition 802 having a size of 2N×2N, a partition 804 having a size of 2N×N, a partition 806 having a size of N×2N, and a partition 808 having a size of N×N. Here, the information 800 about a partition type is set to indicate one of the partition 804 having a size of 2N×N, the partition 806 having a size of N×2N, and the partition 808 having a size of N×N.

The information 810 indicates a prediction mode of each partition. For example, the information 810 may indicate a mode of prediction encoding performed on a partition indicated by the information 800, i.e., an intra mode 812, an inter mode 814, or a skip mode 816.

The information 820 indicates a transformation unit to be based on when transformation is performed on a current coding unit. For example, the transformation unit may be a first intra transformation unit 822, a second intra transformation unit 824, a first inter transformation unit 826, or a second inter transformation unit 828.

The image data and encoding information extractor 220 of the video decoding apparatus 200 according to an embodiment may extract and use the information 800, 810, and 820 for decoding, according to each deeper coding unit.

Figure 16:
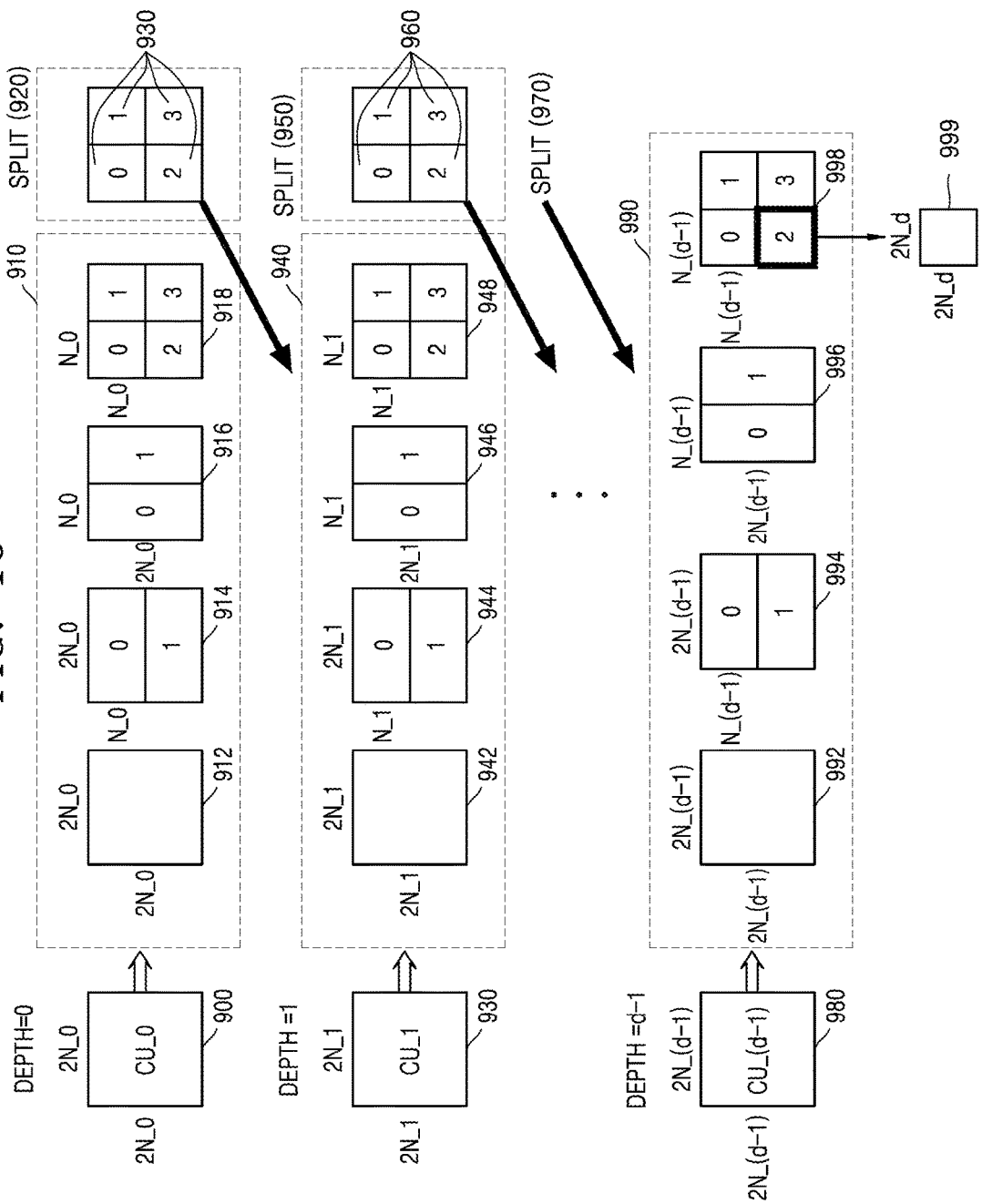
FIG. 16 is a diagram of coding units according to an embodiment.

FIG. 16 is a diagram of deeper coding units according to depths, according to various embodiments.

Split information may be used to indicate a change of a depth. The spilt information indicates whether a coding unit of a current depth is split into coding units of a lower depth.

A prediction unit 910 for prediction encoding a coding unit 900 having a depth of 0 and a size of 2N_0×2N_0 may include partitions of a partition mode 912 having a size of 2N_0×2N_0, a partition mode 914 having a size of 2N_0×N_0, a partition mode 916 having a size of N_0×2N_0, and a partition mode 918 having a size of N_0×N_0. FIG. 9 only illustrates the partitions 912 through 918 which are obtained by symmetrically splitting the prediction unit, but a partition mode is not limited thereto, and the partitions of the prediction unit may include asymmetrical partitions, partitions having a predetermined shape, and partitions having a geometrical shape.

Prediction encoding is repeatedly performed on one partition having a size of 2N_0×2N_0, two partitions having a size of 2N_0×N_0, two partitions having a size of N_0×2N_0, and four partitions having a size of N_0×N_0, according to each partition mode. The prediction encoding in an intra mode and an inter mode may be performed on the partitions having the sizes of 2N_0×2N_0, N_0×2N_0, 2N_0×N_0, and N_0×N_0. The prediction encoding in a skip mode is performed only on the partition having the size of 2N_0×2N_0.

If an encoding error is smallest in one of the partition modes 912 through 916, the prediction unit 910 may not be split into a lower depth.

If the encoding error is the smallest in the partition mode 918, a depth is changed from 0 to 1 to split the partition mode 918 in operation 920, and encoding is repeatedly performed on coding units 930 having a depth of 2 and a size of N_0×N_0 to search for a minimum encoding error.

A prediction unit 940 for prediction encoding the coding unit 930 having a depth of 1 and a size of 2N_1×2N_1 (=N_0×N_0) may include partitions of a partition mode 942 having a size of 2N_1×2N_1, a partition mode 944 having a size of 2N_1×N_1, a partition mode 946 having a size of N_1×2N_1, and a partition mode 948 having a size of N_1×N_1.

If an encoding error is the smallest in the partition mode 948, a depth is changed from 1 to 2 to split the partition mode 948 in operation 950, and encoding is repeatedly performed on coding units 960, which have a depth of 2 and a size of N_2×N_2 to search for a minimum encoding error.

When a maximum depth is d, split operation according to each depth may be performed up to when a depth becomes d−1, and split information may be encoded as up to when a depth is one of 0 to d−2. In other words, when encoding is performed up to when the depth is d−1 after a coding unit corresponding to a depth of d−2 is split in operation 970, a prediction unit 990 for prediction encoding a coding unit 980 having a depth of d−1 and a size of 2N_(d−1)×2N_(d−1) may include partitions of a partition mode 992 having a size of 2N_(d−1)×2N_(d−1), a partition mode 994 having a size of 2N_(d−1)×N_(d−1), a partition mode 996 having a size of N_(d−1)×2N_(d−1), and a partition mode 998 having a size of N_(d−1)×N_(d−1).

Prediction encoding may be repeatedly performed on one partition having a size of 2N_(d−1)×2N_(d−1), two partitions having a size of 2N_(d−1)×N_(d−1), two partitions having a size of N_(d−1)×2N_(d−1), four partitions having a size of N_(d−1)×N_(d−1) from among the partition modes to search for a partition mode having a minimum encoding error.

Even when the partition mode 998 has the minimum encoding error, since a maximum depth is d, a coding unit CU_(d−1) having a depth of d−1 is no longer split to a lower depth, and a depth for the coding units constituting a current maximum coding unit 900 is determined to be d−1 and a partition mode of the current maximum coding unit 900 may be determined to be N_(d−1)×N_(d−1). Also, since the maximum depth is d, split information for a coding unit 952 having a depth of d−1 is not set.

A data unit 999 may be a 'minimum unit' for the current maximum coding unit. A minimum unit according to an embodiment may be a square data unit obtained by splitting a minimum coding unit having a lowermost depth by 4. By performing the encoding repeatedly, the video encoding apparatus 100 according to an embodiment may select a depth having the least encoding error by comparing encoding errors according to depths of the coding unit 900 to determine a depth, and set a corresponding partition mode and a prediction mode as an encoding mode of the depth.

As such, the minimum encoding errors according to depths are compared in all of the depths of 1 through d, and a depth having the least encoding error may be determined as a d depth. The depth, the partition mode of the prediction unit, and the prediction mode may be encoded and transmitted as split information. Also, since a coding unit is split from a depth of 0 to a depth, only split information of the depth is set to 0, and split information of depths excluding the depth is set to 1.

The image data and encoding information extractor 220 of the video decoding apparatus 200 according to an embodiment may extract and use the information about the depth and the prediction unit of the coding unit 900 to decode the partition 912. The video decoding apparatus 200 according to an embodiment may determine a depth, in which split information is 0, as a depth by using split information according to depths, and use split information of the corresponding depth for decoding.

units 1070 in a data unit that is smaller than the coding unit 1052. Also, the coding units 1014, 1016, 1022, 1032, 1048, 1050, and 1052 in the transformation units 1070 are different from those in the prediction units 1060 in terms of sizes and shapes. In other words, the video encoding and decoding apparatuses 100 and 200 according to various embodiments may perform intra prediction, motion estimation, motion compensation, transformation, and inverse transformation individually on a data unit in the same coding unit.

Accordingly, encoding is recursively performed on each of coding units having a hierarchical structure in each region of a maximum coding unit to determine an optimum coding unit, and thus coding units having a recursive tree structure may be obtained. Encoding information may include split information about a coding unit, information about a partition mode, information about a prediction mode, and information about a size of a transformation unit. Table 1 shows the encoding information that may be set by the video encoding and decoding apparatuses 100 and 200 according to an embodiment.

TABLE 1

Split Information 0
(Encoding on Coding Unit having Size of 2N × 2N and Current Depth of d)

| | | | Size of Transformation Unit | | |
|---|---|---|---|---|---|
| | Partition Type | | Split Information 0 | Split Information 1 | |
| Prediction Mode | Symmetrical Partition Type | Asymmetrical Partition Type | of Transformation Unit | of Transformation Unit | Split Information 1 |
| Intra Inter Skip (Only 2N × 2N) | 2N × 2N 2N × N N × 2N N × N | 2N × nU 2N × nD nL × 2N nR × 2N | 2N × 2N | N × N (Symmetrical Type) N/2 × N/2 (Asymmetrical Type) | Repeatedly Encode Coding Units having Lower Depth of d + 1 |

Figure 17:
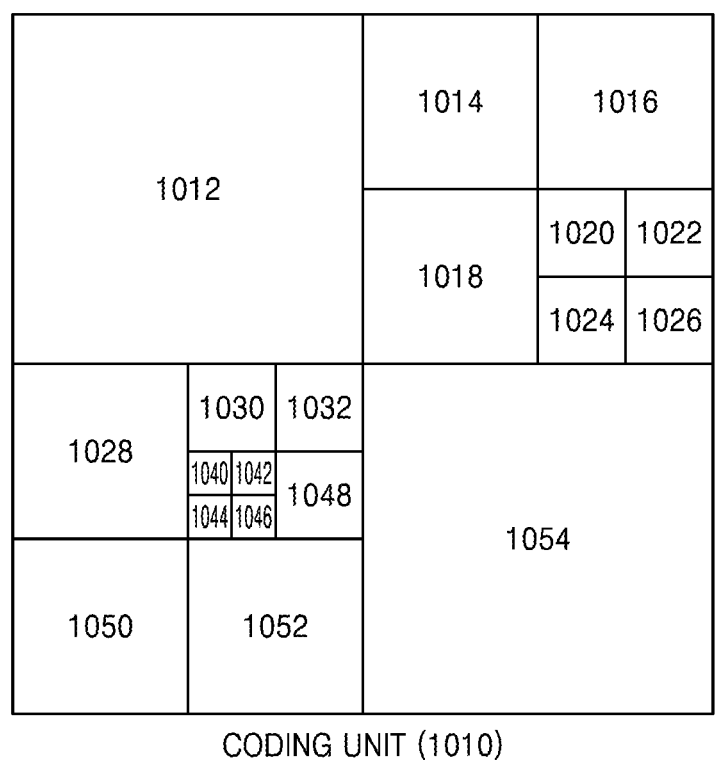
FIGS. 17 through 19 are diagrams for describing a relationship between coding units, prediction units, and transformation units, according to an embodiment.
Figure 18:
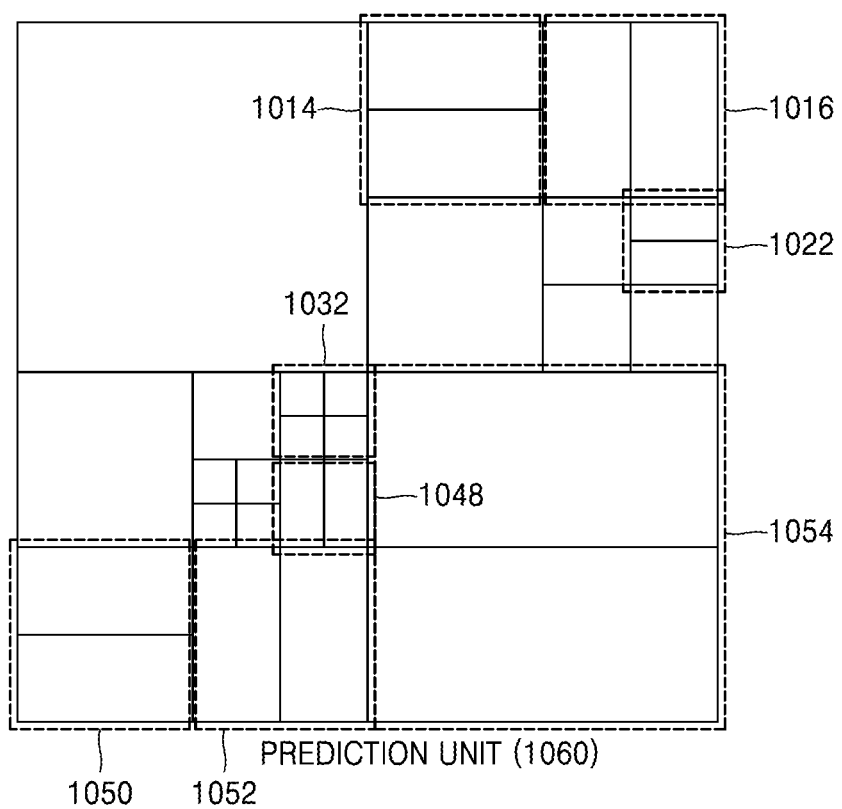
Figure 19:
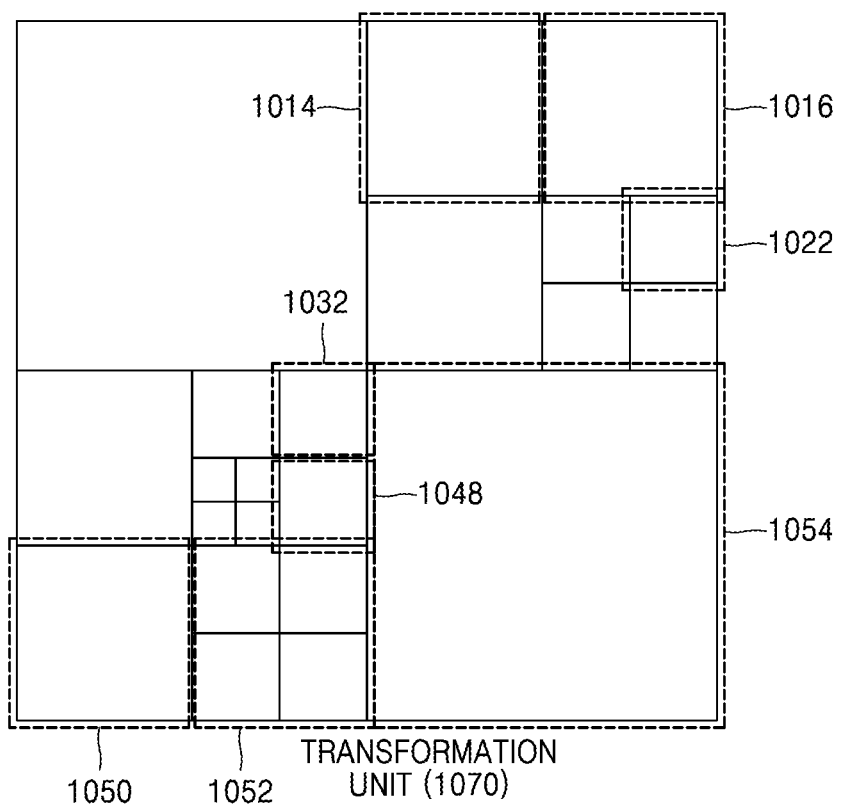

FIGS. 17 through 19 are diagrams for describing a relationship between coding units, prediction units, and transformation units, according to various embodiments.

Coding units 1010 are coding units having a tree structure, according to depths determined by the video encoding apparatus 100 according to an embodiment, in a maximum coding unit. Prediction units 1060 are partitions of prediction units of each of coding units according to depths, and transformation units 1070 are transformation units of each of coding units according to depths.

When a depth of a maximum coding unit is 0 in the coding units 1010, depths of coding units 1012 and 1054 are 1, depths of coding units 1014, 1016, 1018, 1028, 1050, and 1052 are 2, depths of coding units 1020, 1022, 1024, 1026, 1030, 1032, and 1048 are 3, and depths of coding units 1040, 1042, 1044, and 1046 are 4.

In the prediction units 1060, some encoding units 1014, 1016, 1022, 1032, 1048, 1050, 1052, and 1054 are obtained by splitting the coding units in the encoding units 1010. In other words, partition modes in the coding units 1014, 1022, 1050, and 1054 have a size of 2N×N, partition modes in the coding units 1016, 1048, and 1052 have a size of N×2N, and a partition modes of the coding unit 1032 has a size of N×N. Prediction units and partitions of the coding units 1010 are smaller than or equal to each coding unit.

Transformation or inverse transformation is performed on image data of the coding unit 1052 in the transformation The output unit 130 of the video encoding apparatus 100 according to an embodiment may output the encoding information about the coding units having a tree structure, and the image data and encoding information extractor 220 of the video decoding apparatus 200 according to an embodiment may extract the encoding information about the coding units having a tree structure from a received bitstream.

Split information indicates whether a current coding unit is split into coding units of a lower depth. If split information of a current depth d is 0, a depth, in which a current coding unit is no longer split into a lower depth, is a depth, and thus information about a partition mode, prediction mode, and a size of a transformation unit may be defined for the depth. If the current coding unit is further split according to the split information, encoding is independently performed on four split coding units of a lower depth.

A prediction mode may be one of an intra mode, an inter mode, and a skip mode. The intra mode and the inter mode may be defined in all partition modes, and the skip mode is defined only in a partition mode having a size of 2N×2N.

The information about the partition mode may indicate symmetrical partition modes having sizes of 2N×2N, 2N×N, N×2N, and N×N, which are obtained by symmetrically splitting a height or a width of a prediction unit, and asymmetrical partition modes having sizes of 2N×nU, 2N×nD, nL×2N, and nR×2N, which are obtained by asymmetrically splitting the height or width of the prediction unit. The asymmetrical partition modes having the sizes of 2N×nU and 2N×nD may be respectively obtained by splitting the height of the prediction unit in 1:3 and 3:1, and the asymmetrical partition modes having the sizes of nL×2N and nR×2N may be respectively obtained by splitting the width of the prediction unit in 1:3 and 3:1

The size of the transformation unit may be set to be two types in the intra mode and two types in the inter mode. In other words, if split information of the transformation unit is 0, the size of the transformation unit may be 2N×2N, which is the size of the current coding unit. If split information of the transformation unit is 1, the transformation units may be obtained by splitting the current coding unit. Also, if a partition mode of the current coding unit having the size of 2N×2N is a symmetrical partition mode, a size of a transformation unit may be N×N, and if the partition type of the current coding unit is an asymmetrical partition mode, the size of the transformation unit may be N/2×N/2.

The encoding information about coding units having a tree structure, according to an embodiment, may include at least one of a coding unit corresponding to a depth, a prediction unit, and a minimum unit. The coding unit corresponding to the depth may include at least one of a prediction unit and a minimum unit containing the same encoding information.

Accordingly, it is determined whether adjacent data units are included in the same coding unit corresponding to the depth by comparing encoding information of the adjacent data units. Also, a corresponding coding unit corresponding to a depth is determined by using encoding information of a data unit, and thus a distribution of depths in a maximum coding unit may be determined.

Accordingly, if a current coding unit is predicted based on encoding information of adjacent data units, encoding information of data units in deeper coding units adjacent to the current coding unit may be directly referred to and used.

Alternatively, if a current coding unit is predicted based on encoding information of adjacent data units, data units adjacent to the current coding unit are searched using encoded information of the data units, and the searched adjacent coding units may be referred for predicting the current coding unit.

Figure 20:
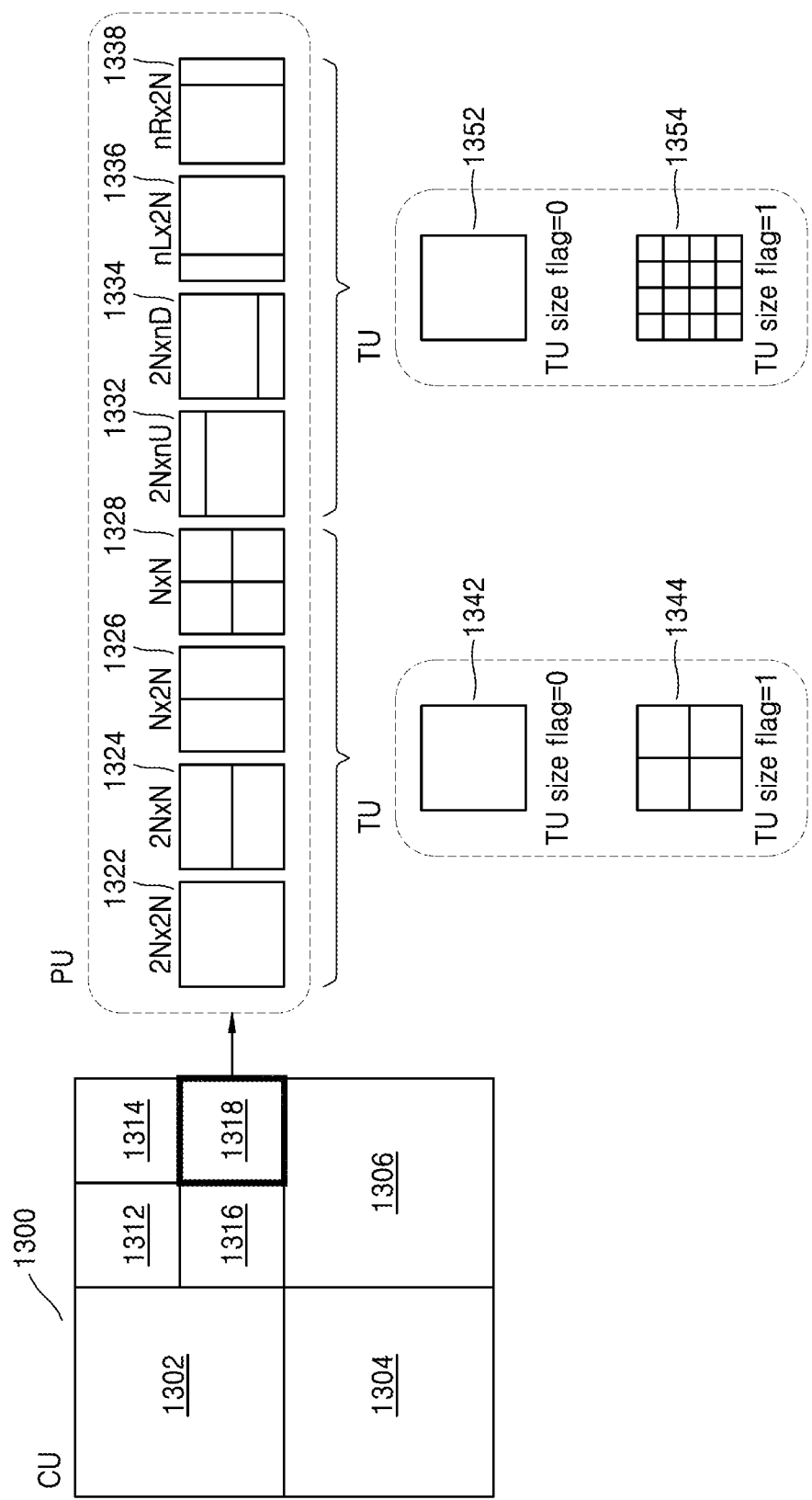
FIG. 20 is a diagram for describing a relationship between a coding unit, a prediction unit, and a transformation unit, according to encoding mode information of Table 1.

FIG. 20 is a diagram for describing a relationship between a coding unit, a prediction unit, and a transformation unit, according to encoding mode information of Table 1.

A maximum coding unit 1300 includes coding units 1302, 1304, 1306, 1312, 1314, 1316, and 1318 of depths. Here, since the coding unit 1318 is a coding unit of a depth, split information may be set to 0. Information about a partition mode of the coding unit 1318 having a size of 2N×2N may be set to be one of a partition mode 1322 having a size of 2N×2N, a partition mode 1324 having a size of 2N×N, a partition mode 1326 having a size of N×2N, a partition mode 1328 having a size of N×N, a partition mode 1332 having a size of 2N×nU, a partition mode 1334 having a size of 2N×nD, a partition mode 1336 having a size of nL×2N, and a partition mode 1338 having a size of nR×2N.

Split information (TU size flag) of a transformation unit is a type of a transformation index. The size of the transformation unit corresponding to the transformation index may be changed according to a prediction unit type or partition mode of the coding unit.

For example, when the partition mode is set to be symmetrical, i.e. the partition mode 1322, 1324, 1326, or 1328, a transformation unit 1342 having a size of 2N×2N is set if a TU size flag of a transformation unit is 0, and a transformation unit 1344 having a size of N×N is set if a TU size flag is 1.

When the partition mode is set to be asymmetrical, i.e., the partition mode 1332, 1334, 1336, or 1338, a transformation unit 1352 having a size of 2N×2N is set if a TU size flag is 0, and a transformation unit 1354 having a size of N/2×N/2 is set if a TU size flag is 1.

Referring to FIG. 19, the TU size flag is a flag having a value or 0 or 1, but the TU size flag according to an embodiment is not limited to 1 bit, and a transformation unit may be hierarchically split having a tree structure while the TU size flag increases from 0. Split information (TU size flag) of a transformation unit may be an example of a transformation index.

In this case, the size of a transformation unit that has been actually used may be expressed by using a TU size flag of a transformation unit, according to an embodiment, together with a maximum size and minimum size of the transformation unit. The video encoding apparatus 100 according to an embodiment is capable of encoding maximum transformation unit size information, minimum transformation unit size information, and a maximum TU size flag. The result of encoding the maximum transformation unit size information, the minimum transformation unit size information, and the maximum TU size flag may be inserted into an SPS. The video decoding apparatus 200 according to an embodiment may decode video by using the maximum transformation unit size information, the minimum transformation unit size information, and the maximum TU size flag.

For example, (a) if the size of a current coding unit is 64×64 and a maximum transformation unit size is 32×32, (a-1) then the size of a transformation unit may be 32×32 when a TU size flag is 0, (a-2) may be 16×16 when the TU size flag is 1, and (a-3) may be 8×8 when the TU size flag is 2.

As another example, (b) if the size of the current coding unit is 32×32 and a minimum transformation unit size is 32×32, (b-1) then the size of the transformation unit may be 32×32 when the TU size flag is 0. Here, the TU size flag cannot be set to a value other than 0, since the size of the transformation unit cannot be less than 32×32.

As another example, (c) if the size of the current coding unit is 64×64 and a maximum TU size flag is 1, then the TU size flag may be 0 or 1. Here, the TU size flag cannot be set to a value other than 0 or 1.

Thus, if it is defined that the maximum TU size flag is 'MaxTransformSizeIndex', a minimum transformation unit size is 'MinTransformSize', and a transformation unit size is 'RootTuSize' when the TU size flag is 0, then a current minimum transformation unit size 'CurrMinTuSize' that can be determined in a current coding unit, may be defined by Equation (1):

$$\text{CurrMinTuSize} = \max(\text{MinTransformSize}, \text{RootTuSize}/(2^{\text{MaxTransformSizeIndex}})) \quad (1)$$

Compared to the current minimum transformation unit size 'CurrMinTuSize' that can be determined in the current coding unit, a transformation unit size 'RootTuSize' when the TU size flag is 0 may denote a maximum transformation unit size that can be selected in the system. In Equation (1), 'RootTuSize/(2^MaxTransformSizeIndex)' denotes a transformation unit size when the transformation unit size 'RootTuSize', when the TU size flag is 0, is split a number of times corresponding to the maximum TU size flag, and 'MinTransformSize' denotes a minimum transformation size. Thus, a smaller value from among 'RootTuSize/(2^MaxTransformSizeIndex)' and 'MinTransformSize' may be the current minimum transformation unit size 'CurrMinTuSize' that can be determined in the current coding unit.

According to an embodiment, the maximum transformation unit size RootTuSize may vary according to the type of a prediction mode.

For example, if a current prediction mode is an inter mode, then 'RootTuSize' may be determined by using Equation (2) below. In Equation (2), 'MaxTransformSize' denotes a maximum transformation unit size, and 'PUSize' denotes a current prediction unit size.

$$RootTuSize=\min(MaxTransformSize, PUSize) \quad (2)$$

That is, if the current prediction mode is the inter mode, the transformation unit size 'RootTuSize', when the TU size flag is 0, may be a smaller value from among the maximum transformation unit size and the current prediction unit size.

If a prediction mode of a current partition unit is an intra mode, 'RootTuSize' may be determined by using Equation (3) below. In Equation (3), 'PartitionSize' denotes the size of the current partition unit.

$$RootTuSize=\min(MaxTransformSize, PartitionSize) \quad (3)$$

That is, if the current prediction mode is the intra mode, the transformation unit size 'RootTuSize' when the TU size flag is 0 may be a smaller value from among the maximum transformation unit size and the size of the current partition unit.

However, the current maximum transformation unit size 'RootTuSize' that varies according to the type of a prediction mode in a partition unit is just an example and the present invention is not limited thereto.

According to the video encoding method based on coding units having a tree structure as described with reference to FIGS. 8 through 20, image data of a spatial region is encoded for each coding unit of a tree structure. According to the video decoding method based on coding units having a tree structure, decoding is performed for each maximum coding unit to reconstruct image data of a spatial region. Thus, a picture and a video that is a picture sequence may be reconstructed. The reconstructed video may be reproduced by a reproducing apparatus, stored in a storage medium, or transmitted through a network.

The embodiments according to the present invention may be written as computer programs and may be implemented in general-use digital computers that execute the programs using a computer-readable recording medium. Examples of the computer-readable recording medium include magnetic storage media (e.g., ROM, floppy discs, hard discs, etc.) and optical recording media (e.g., CD-ROMs, or DVDs).

For convenience of description, the interlayer video encoding method and/or the video encoding method described above with reference to FIGS. 1A through 20 will be collectively referred to as a 'video encoding method of the present invention'. In addition, the interlayer video decoding method and/or the video decoding method described above with reference to FIGS. 1A through 20 will be referred to as a 'video decoding method of the present invention'.

Also, a video encoding apparatus including the interlayer video encoding apparatus 10, the video encoding apparatus 100, or the image encoder 400, which has been described with reference to FIGS. 1A through 20, will be referred to as a 'video encoding apparatus of the present invention'. In addition, a video decoding apparatus including the interlayer video decoding apparatus 20, the video decoding apparatus 200, or the image decoder 500, which has been descried with reference to FIGS. 1A through 20, will be referred to as a 'video decoding apparatus of the present invention'.

A computer-readable recording medium storing a program, e.g., a disc 26000, according to an embodiment will now be described in detail.

Figure 21:
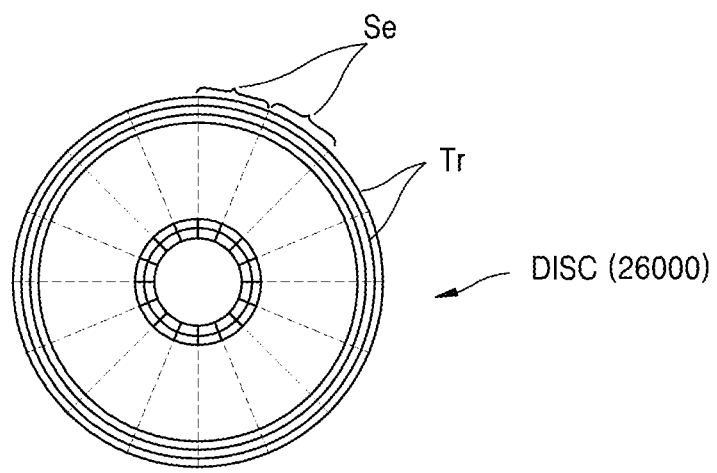
FIG. 21 is a diagram of a physical structure of a disc in which a program is stored, according to an embodiment.

FIG. 21 is a diagram of a physical structure of the disc 26000 in which a program is stored, according to various embodiments. The disc 26000, which is a storage medium, may be a hard drive, a compact disc-read only memory (CD-ROM) disc, a Blu-ray disc, or a digital versatile disc (DVD). The disc 26000 includes a plurality of concentric tracks Tr that are each divided into a specific number of sectors Se in a circumferential direction of the disc 26000. In a specific region of the disc 26000 according to the an embodiment, a program that executes the quantization parameter determining method, the video encoding method, and the video decoding method described above may be assigned and stored.

A computer system embodied using a storage medium that stores a program for executing the video encoding method and the video decoding method as described above will now be described with reference to FIG. 22.

Figure 22:
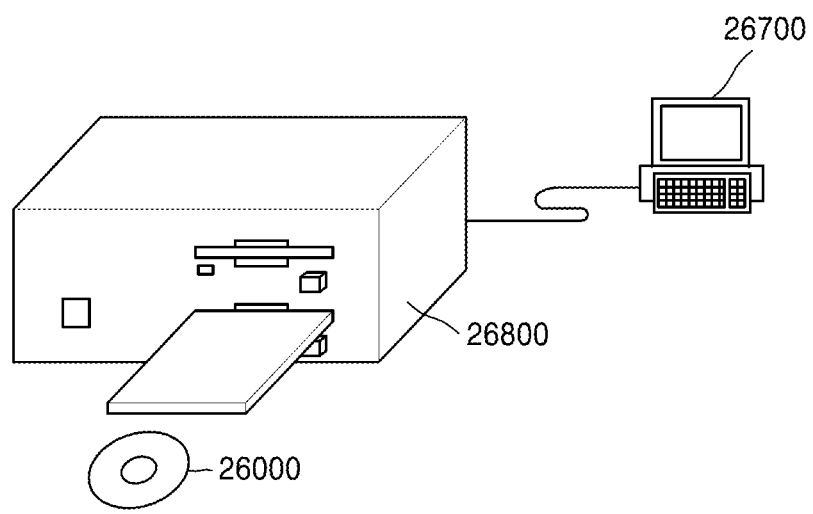
FIG. 22 is a diagram of a disc drive for recording and reading a program by using a disc.

FIG. 22 is a diagram of a disc drive 26800 for recording and reading a program by using the disc 26000. A computer system 27000 may store a program that executes at least one of a video encoding method and a video decoding method of the present invention, in the disc 26000 via the disc drive 26800. To run the program stored in the disc 26000 in the computer system 27000, the program may be read from the disc 26000 and be transmitted to the computer system 26700 by using the disc drive 27000.

The program that executes at least one of a video encoding method and a video decoding method of the present invention may be stored not only in the disc 26000 illustrated in FIG. 21 or 22 but also in a memory card, a ROM cassette, or a solid state drive (SSD).

A system to which the video encoding method and a video decoding method described above are applied will be described below.

Figure 23:
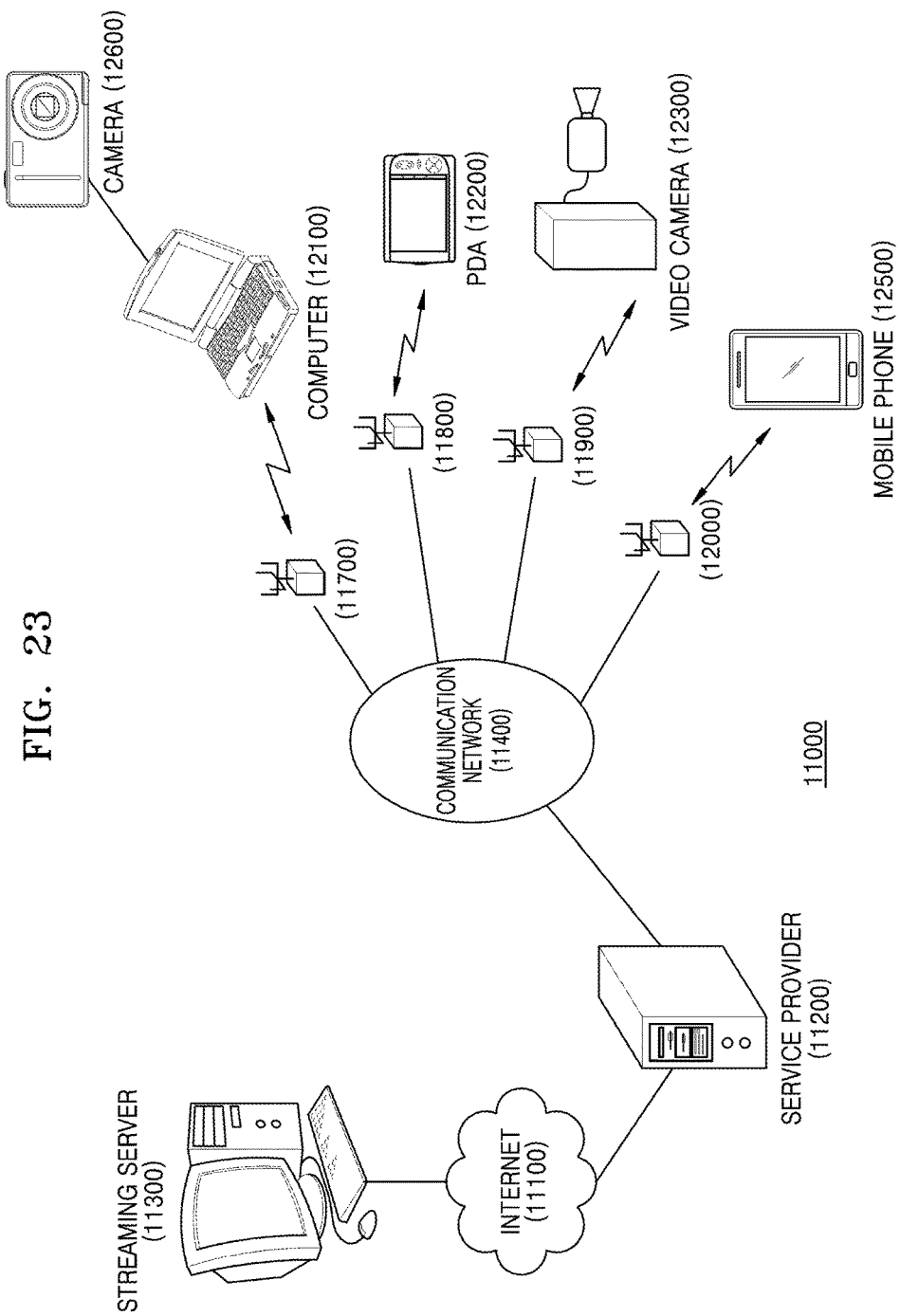
FIG. 23 is a diagram of an overall structure of a content supply system for providing a content distribution service.

FIG. 23 is a diagram of an overall structure of a content supply system 11000 for providing a content distribution service. A service area of a communication system is divided into predetermined-sized cells, and wireless base stations 11700, 11800, 11900, and 12000 are installed in these cells, respectively.

The content supply system 11000 includes a plurality of independent devices. For example, the plurality of independent devices, such as a computer 12100, a personal digital assistant (PDA) 12200, a video camera 12300, and a mobile phone 12500, are connected to the Internet 11100 via an internet service provider 11200, a communication network 11400, and the wireless base stations 11700, 11800, 11900, and 12000.

Figure 24:
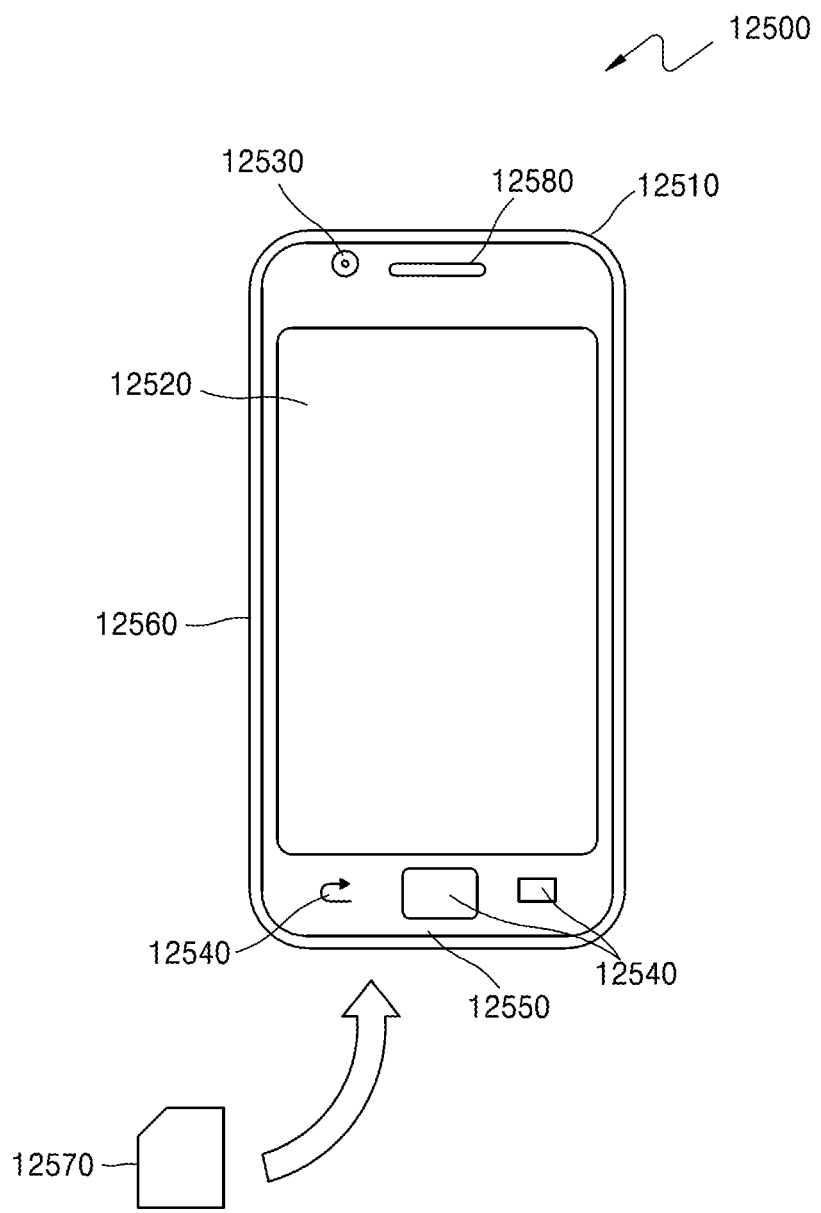
FIGS. 24 and 25 are diagrams respectively of an external structure and an internal structure of a mobile phone to which a video encoding method and a video decoding method of the present invention are applied, according to an embodiment.

However, the content supply system 11000 is not limited to as illustrated in FIG. 24, and devices may be selectively connected thereto. The plurality of independent devices may be directly connected to the communication network 11400, not via the wireless base stations 11700, 11800, 11900, and 12000.

The video camera 12300 is an imaging device, e.g., a digital video camera, which is capable of capturing video images. The mobile phone 12500 may employ at least one communication method from among various protocols, e.g., Personal Digital Communications (PDC), Code Division Multiple Access (CDMA), Wideband-Code Division Multiple Access (W-CDMA), Global System for Mobile Communications (GSM), and Personal Handyphone System (PHS).

The video camera 12300 may be connected to a streaming server 11300 via the wireless base station 11900 and the communication network 11400. The streaming server 11300 allows content received from a user via the video camera 12300 to be streamed via a real-time broadcast. The content received from the video camera 12300 may be encoded using the video camera 12300 or the streaming server 11300. Video data captured by the video camera 12300 may be transmitted to the streaming server 11300 via the computer 12100.

Video data captured by a camera 12600 may also be transmitted to the streaming server 11300 via the computer 12100. The camera 12600 is an imaging device capable of capturing both still images and video images, similar to a digital camera. The video data captured by the camera 12600 may be encoded using the camera 12600 or the computer 12100. Software that performs encoding and decoding video may be stored in a computer-readable recording medium, e.g., a CD-ROM disc, a floppy disc, a hard disc drive, an SSD, or a memory card, which may be accessible by the computer 12100.

If video data is captured by a camera built in the mobile phone 12500, the video data may be received from the mobile phone 12500.

The video data may also be encoded by a large scale integrated circuit (LSI) system installed in the video camera 12300, the mobile phone 12500, or the camera 12600.

The content supply system 11000 according to an embodiment may encode content data recorded by a user using the video camera 12300, the camera 12600, the mobile phone 12500, or another imaging device, e.g., content recorded during a concert, and transmit the encoded content data to the streaming server 11300. The streaming server 11300 may transmit the encoded content data in a type of a streaming content to other clients that request the content data.

The clients are devices capable of decoding the encoded content data, e.g., the computer 12100, the PDA 12200, the video camera 12300, or the mobile phone 12500. Thus, the content supply system 11000 allows the clients to receive and reproduce the encoded content data. Also, the content supply system 11000 allows the clients to receive the encoded content data and decode and reproduce the encoded content data in real time, thereby enabling personal broadcasting.

Encoding and decoding operations of the plurality of independent devices included in the content supply system 11000 may be similar to those of a video encoding apparatus and a video decoding apparatus of the present invention.

The mobile phone 12500 included in the content supply system 11000 according to an embodiment will now be described in greater detail with referring to FIGS. 24 and 25.

FIG. 24 illustrates an external structure of the mobile phone 12500 to which a video encoding method and a video decoding method of the present invention are applied, according to various embodiments. The mobile phone 12500 may be a smart phone, the functions of which are not limited and a large number of the functions of which may be changed or expanded.

The mobile phone 12500 includes an internal antenna 12510 via which a radio-frequency (RF) signal may be exchanged with the wireless base station 12000 of FIG. 21, and includes a display screen 12520 for displaying images captured by a camera 12530 or images that are received via the antenna 12510 and decoded, e.g., a liquid crystal display (LCD) or an organic light-emitting diode (OLED) screen. The mobile phone 12500 includes an operation panel 12540 including a control button and a touch panel. If the display screen 12520 is a touch screen, the operation panel 12540 further includes a touch sensing panel of the display screen 12520. The mobile phone 12500 includes a speaker 12580 for outputting voice and sound or another type of sound output unit, and a microphone 12550 for inputting voice and sound or another type sound input unit. The mobile phone 12500 further includes the camera 12530, such as a charge-coupled device (CCD) camera, to capture video and still images. The mobile phone 12500 may further include a storage medium 12570 for storing encoded/decoded data, e.g., video or still images captured by the camera 12530, received via email, or obtained according to various ways; and a slot 12560 via which the storage medium 12570 is loaded into the mobile phone 12500. The storage medium 12570 may be a flash memory, e.g., a secure digital (SD) card or an electrically erasable and programmable read only memory (EEPROM) included in a plastic case.

Figure 25:
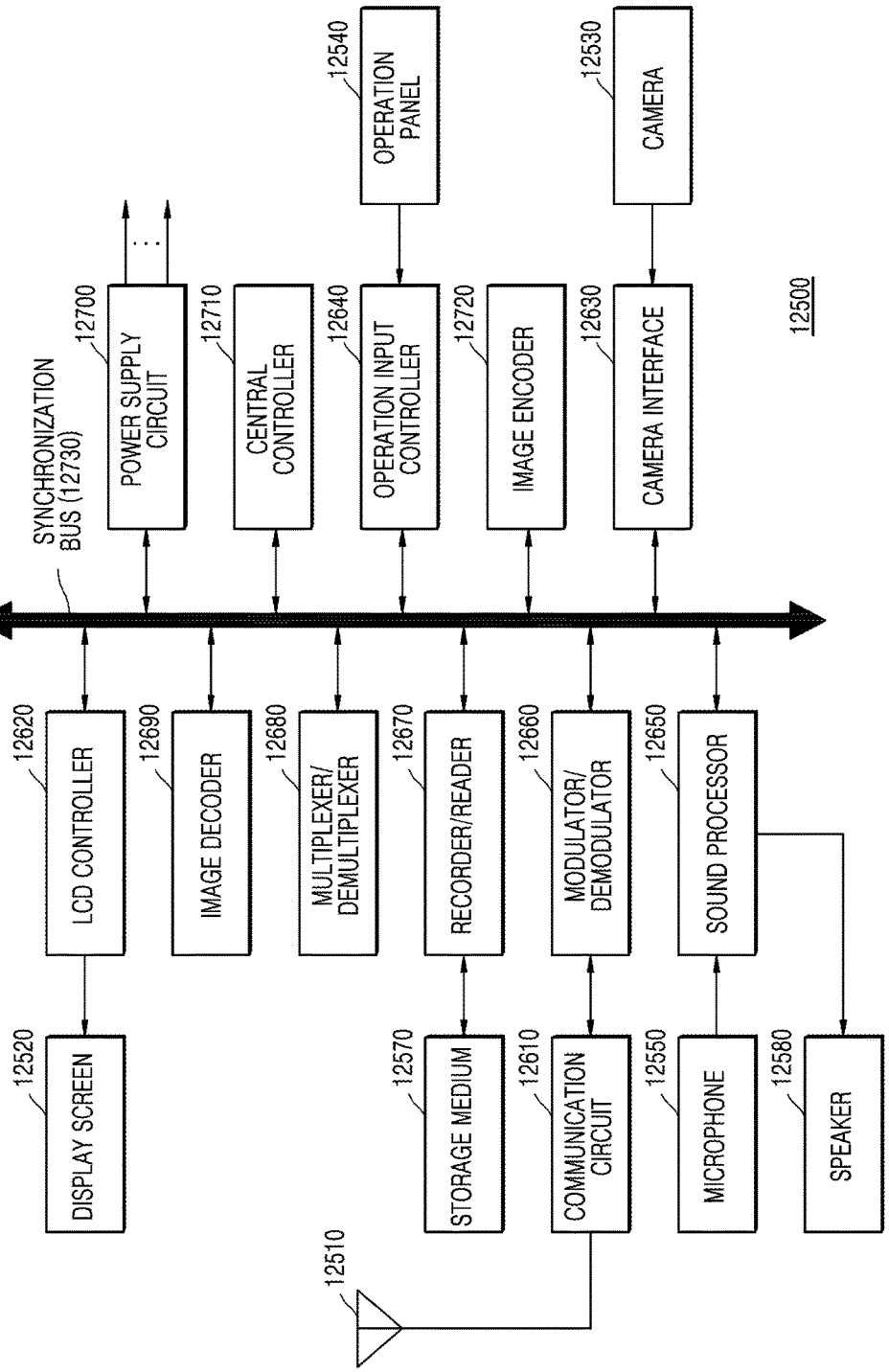

FIG. 25 illustrates an internal structure of the mobile phone 12500. To systemically control parts of the mobile phone 12500 including the display screen 12520 and the operation panel 12540, a power supply circuit 12700, an operation input controller 12640, an image encoding unit 12720, a camera interface 12630, an LCD controller 12620, an image decoding unit 12690, a multiplexer/demultiplexer 12680, a recording/reading unit 12670, a modulation/demodulation unit 12660, and a sound processor 12650 are connected to a central controller 12710 via a synchronization bus 12730.

If a user operates a power button and sets from a 'power off' state to a power on' state, the power supply circuit 12700 supplies power to all the parts of the mobile phone 12500 from a battery pack, thereby setting the mobile phone 12500 in an operation mode.

The central controller 12710 includes a central processing unit (CPU), a ROM, and a RAM.

While the mobile phone 12500 transmits communication data to the outside, a digital signal is generated by the mobile phone 12500 under control of the central controller 12710. For example, the sound processor 12650 may generate a digital sound signal, the image encoding unit 12720 may generate a digital image signal, and text data of a message may be generated via the operation panel 12540 and the operation input controller 12640. When a digital signal is transmitted to the modulation/demodulation unit 12660 under control of the central controller 12710, the modulation/demodulation unit 12660 modulates a frequency band of the digital signal, and a communication circuit 12610 performs digital-to-analog conversion (DAC) and frequency conversion on the frequency band-modulated digital sound signal. A transmission signal output from the communication circuit 12610 may be transmitted to a voice communication base station or the wireless base station 12000 via the antenna 12510.

For example, when the mobile phone 12500 is in a conversation mode, a sound signal obtained via the microphone 12550 is transformed into a digital sound signal by the sound processor 12650, under control of the central controller 12710. The digital sound signal may be transformed into a transformation signal via the modulation/demodulation unit 12660 and the communication circuit 12610, and may be transmitted via the antenna 12510.

When a text message, e.g., email, is transmitted in a data communication mode, text data of the text message is input via the operation panel 12540 and is transmitted to the central controller 12610 via the operation input controller 12640. Under control of the central controller 12610, the text data is transformed into a transmission signal via the modulation/demodulation unit 12660 and the communication circuit 12610 and is transmitted to the wireless base station 12000 via the antenna 12510.

To transmit image data in the data communication mode, image data captured by the camera 12530 is provided to the image encoding unit 12720 via the camera interface 12630. The captured image data may be directly displayed on the display screen 12520 via the camera interface 12630 and the LCD controller 12620.

A structure of the image encoding unit 12720 may correspond to that of the video encoding apparatus 100 described above. The image encoding unit 12720 may transform the image data received from the camera 12530 into compressed and encoded image data according to the video encoding method described above, and then output the encoded image data to the multiplexer/demultiplexer 12680. During a recording operation of the camera 12530, a sound signal obtained by the microphone 12550 of the mobile phone 12500 may be transformed into digital sound data via the sound processor 12650, and the digital sound data may be transmitted to the multiplexer/demultiplexer 12680.

The multiplexer/demultiplexer 12680 multiplexes the encoded image data received from the image encoding unit 12720, together with the sound data received from the sound processor 12650. A result of multiplexing the data may be transformed into a transmission signal via the modulation/demodulation unit 12660 and the communication circuit 12610, and may then be transmitted via the antenna 12510.

While the mobile phone 12500 receives communication data from the outside, frequency recovery and ADC are performed on a signal received via the antenna 12510 to transform the signal into a digital signal. The modulation/demodulation unit 12660 modulates a frequency band of the digital signal. The frequency-band modulated digital signal is transmitted to the video decoding unit 12690, the sound processor 12650, or the LCD controller 12620, according to the type of the digital signal.

In the conversation mode, the mobile phone 12500 amplifies a signal received via the antenna 12510, and obtains a digital sound signal by performing frequency conversion and ADC on the amplified signal. A received digital sound signal is transformed into an analog sound signal via the modulation/demodulation unit 12660 and the sound processor 12650, and the analog sound signal is output via the speaker 12580, under control of the central controller 12710.

When in the data communication mode, data of a video file accessed at an Internet website is received, a signal received from the wireless base station 12000 via the antenna 12510 is output as multiplexed data via the modulation/demodulation unit 12660, and the multiplexed data is transmitted to the multiplexer/demultiplexer 12680.

To decode the multiplexed data received via the antenna 12510, the multiplexer/demultiplexer 12680 demultiplexes the multiplexed data into an encoded video data stream and an encoded audio data stream. Via the synchronization bus 12730, the encoded video data stream and the encoded audio data stream are provided to the video decoding unit 12690 and the sound processor 12650, respectively.

A structure of the image decoding unit 12690 may correspond to that of the video decoding apparatus 200 described above. The image decoding unit 12690 may decode the encoded video data to obtain reconstructed video data and provide the reconstructed video data to the display screen 12520 via the LCD controller 12620, according to a video decoding method employed by the video decoding apparatus 200 or the image decoder 500 described above.

Thus, the data of the video file accessed at the Internet website may be displayed on the display screen 12520. At the same time, the sound processor 12650 may transform audio data into an analog sound signal, and provide the analog sound signal to the speaker 12580. Thus, audio data contained in the video file accessed at the Internet website may also be reproduced via the speaker 12580.

The mobile phone 12500 or another type of communication terminal may be a transceiving terminal including both a video encoding apparatus and a video decoding apparatus of the present invention, may be a transceiving terminal including only the video encoding apparatus, or may be a transceiving terminal including only the video decoding apparatus.

Figure 26:
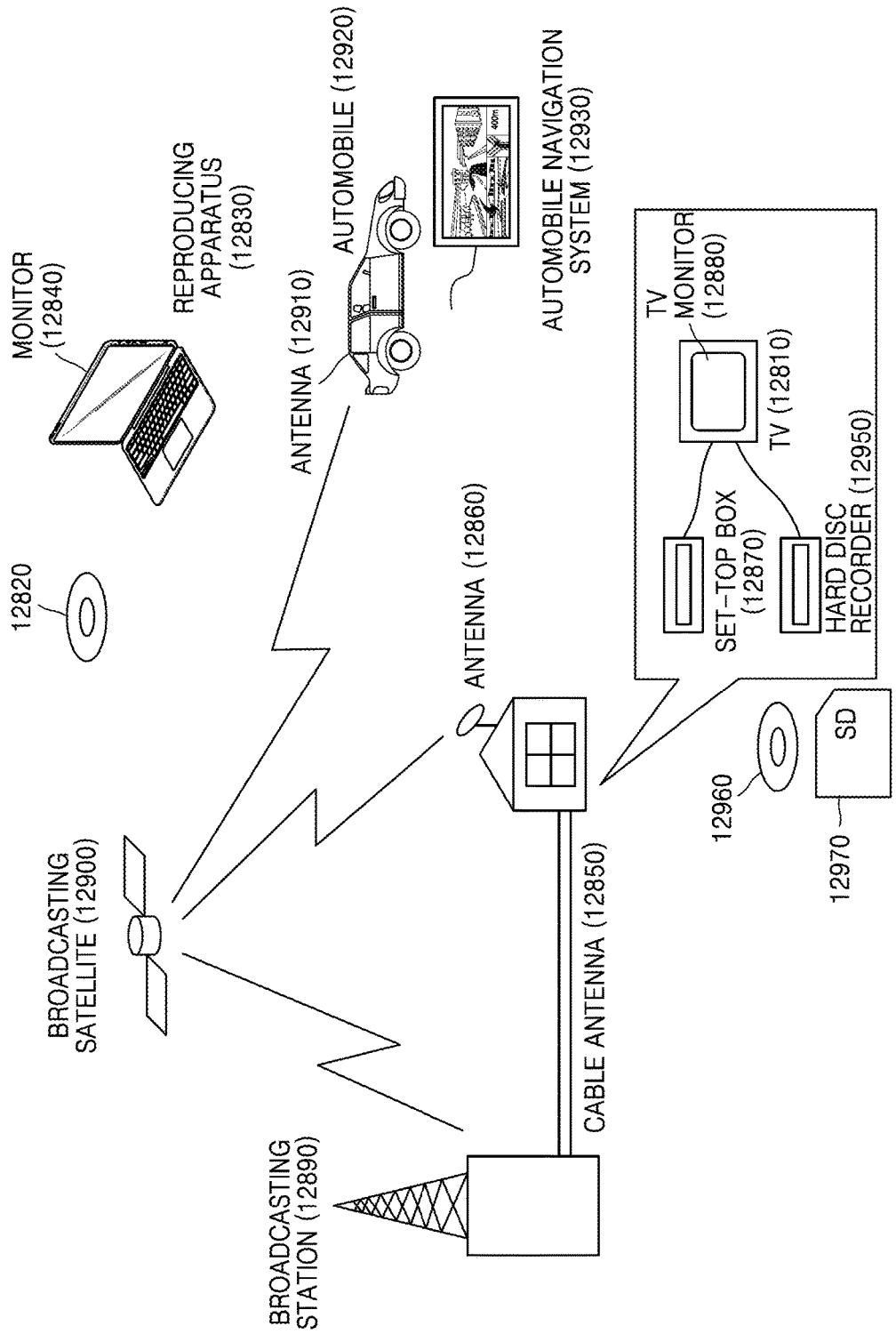
FIG. 26 is a diagram of a digital broadcast system to which a communication system is applied, according to the present invention.

A communication system according to the present invention is not limited to the communication system described above with reference to FIG. 24. For example, FIG. 26 illustrates a digital broadcasting system employing a communication system, according to an embodiment. The digital broadcasting system of FIG. 26 according to various embodiments may receive a digital broadcast transmitted via a satellite or a terrestrial network by using a video encoding apparatus and a video decoding apparatus of the present invention.

Specifically, a broadcasting station 12890 transmits a video data stream to a communication satellite or a broadcasting satellite 12900 by using radio waves. The broadcasting satellite 12900 transmits a broadcast signal, and the broadcast signal is transmitted to a satellite broadcast receiver via a household antenna 12860. In every house, an encoded video stream may be decoded and reproduced by a TV receiver 12810, a set-top box 12870, or another device.

When a video decoding apparatus of the present invention is implemented in a reproducing apparatus 12830, the reproducing apparatus 12830 may parse and decode an encoded video stream recorded on a storage medium 12820, such as a disc or a memory card to reconstruct digital signals. Thus, the reconstructed video signal may be reproduced, for example, on a monitor 12840.

In the set-top box 12870 connected to the antenna 12860 for a satellite/terrestrial broadcast or a cable antenna 12850 for receiving a cable television (TV) broadcast, a video decoding apparatus of the present invention may be installed. Data output from the set-top box 12870 may also be reproduced on a TV monitor 12880.

As another example, a video decoding apparatus of the present invention may be installed in the TV receiver 12810 instead of the set-top box 12870.

An automobile 12920 that has an appropriate antenna 12910 may receive a signal transmitted from the satellite 12900 or the wireless base station 11700 of FIG. 23. A decoded video may be reproduced on a display screen of an automobile navigation system 12930 installed in the automobile 12920.

A video signal may be encoded by a video encoding apparatus of the present invention and may then be stored in a storage medium. Specifically, an image signal may be stored in a DVD disc 12960 by a DVD recorder or may be stored in a hard disc by a hard disc recorder 12950. As another example, the video signal may be stored in an SD card 12970. If the hard disc recorder 12950 includes a video decoding apparatus of the present invention according to an embodiment, a video signal recorded on the DVD disc 12960, the SD card 12970, or another storage medium may be reproduced on the TV monitor 12880.

The automobile navigation system 12930 may not include the camera 12530, the camera interface 12630, and the image encoding unit 12720 of FIG. 26. For example, the computer 12100 and the TV receiver 12810 may not be included in the camera 12530, the camera interface 12630, and the image encoding unit 12720 of FIG. 26.

Figure 27:
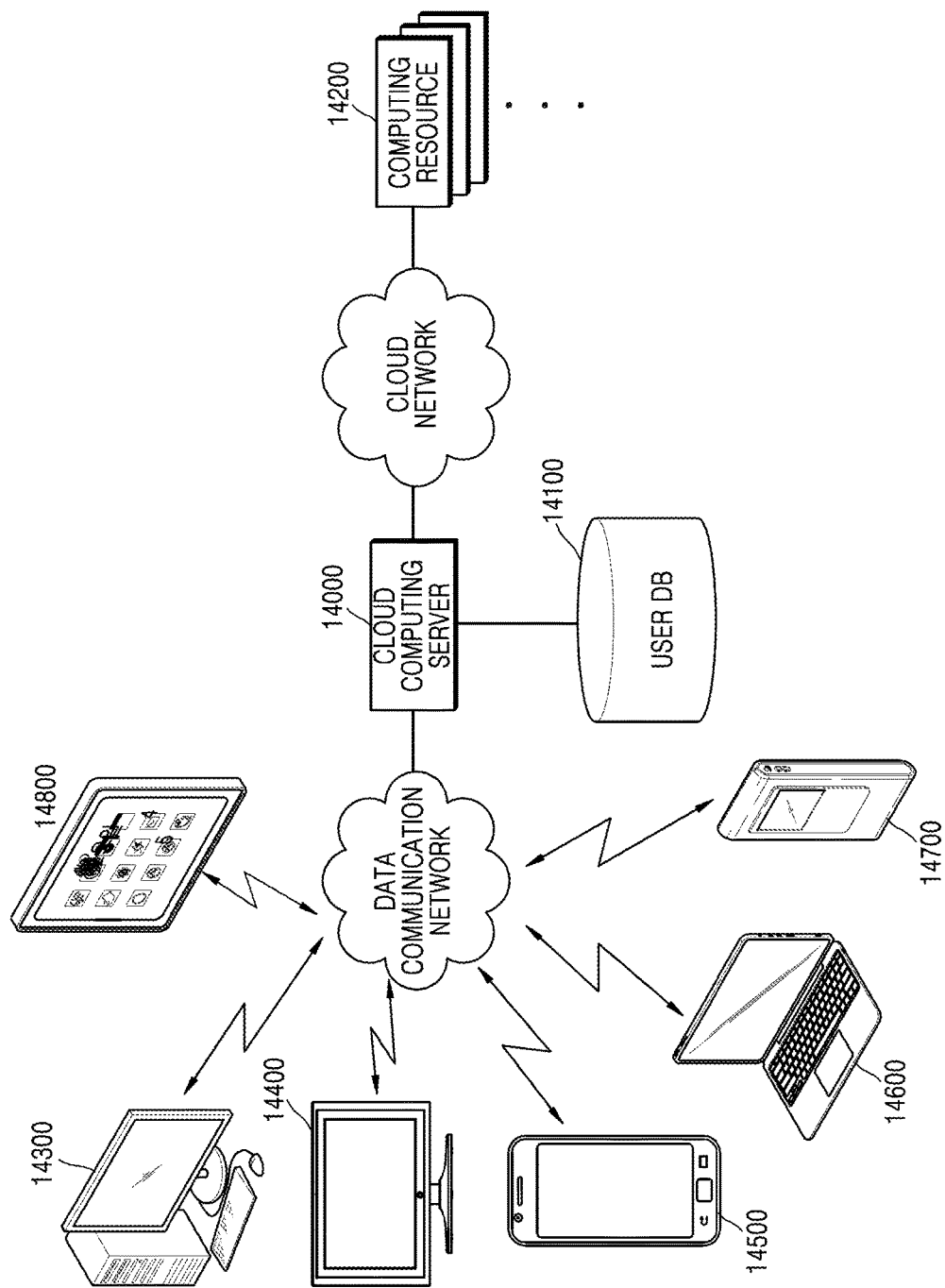
FIG. 27 is a diagram illustrating a network structure of a cloud computing system using a video encoding apparatus and a video decoding apparatus, according to an embodiment.

FIG. 27 is a diagram illustrating a network structure of a cloud computing system using a video encoding apparatus and a video decoding apparatus, according to various embodiments.

The cloud computing system may include a cloud computing server 14000, a user database (DB) 14100, a plurality of computing resources 14200, and a user terminal.

The cloud computing system provides an on-demand outsourcing service of the plurality of computing resources 14200 via a data communication network, e.g., the Internet, in response to a request from the user terminal. Under a cloud computing environment, a service provider provides users with desired services by combining computing resources at data centers located at physically different locations by using virtualization technology. A service user does not have to install computing resources, e.g., an application, a storage, an operating system (OS), and security, into his/her own terminal in order to use them, but may select and use desired services from among services in a virtual space generated through the virtualization technology, at a desired point in time.

A user terminal of a specified service user is connected to the cloud computing server 14000 via a data communication network including the Internet and a mobile telecommunication network. User terminals may be provided cloud computing services, and particularly video reproduction services, from the cloud computing server 14000. The user terminals may be various types of electronic devices capable of being connected to the Internet, e.g., a desktop PC 14300, a smart TV 14400, a smart phone 14500, a notebook computer 14600, a portable multimedia player (PMP) 14700, a tablet PC 14800, and the like.

The cloud computing server 14000 may combine the plurality of computing resources 14200 distributed in a cloud network and provide user terminals with a result of combining. The plurality of computing resources 14200 may include various data services, and may include data uploaded from user terminals. As described above, the cloud computing server 14000 may provide user terminals with desired services by combining video database distributed in different regions according to the virtualization technology.

User information about users who have subscribed for a cloud computing service is stored in the user DB 14100. The user information may include logging information, addresses, names, and personal credit information of the users. The user information may further include indexes of videos. Here, the indexes may include a list of videos that have already been reproduced, a list of videos that are being reproduced, a pausing point of a video that was being reproduced, and the like.

Information about a video stored in the user DB 14100 may be shared between user devices. For example, when a video service is provided to the notebook computer 14600 in response to a request from the notebook computer 14600, a reproduction history of the video service is stored in the user DB 14100. When a request to reproduce this video service is received from the smart phone 14500, the cloud computing server 14000 searches for and reproduces this video service, based on the user DB 14100. When the smart phone 14500 receives a video data stream from the cloud computing server 14000, a process of reproducing video by decoding the video data stream is similar to an operation of the mobile phone 12500 described above with reference to FIG. 24.

The cloud computing server 14000 may refer to a reproduction history of a desired video service, stored in the user DB 14100. For example, the cloud computing server 14000 receives a request to reproduce a video stored in the user DB 14100, from a user terminal. If this video was being reproduced, then a method of streaming this video, performed by the cloud computing server 14000, may vary according to the request from the user terminal, i.e., according to whether the video will be reproduced, starting from a start thereof or a pausing point thereof. For example, if the user terminal requests to reproduce the video, starting from the start thereof, the cloud computing server 14000 transmits streaming data of the video starting from a first frame thereof to the user terminal. If the user terminal requests to reproduce the video, starting from the pausing point thereof, the cloud computing server 14000 transmits streaming data of the video starting from a frame corresponding to the pausing point, to the user terminal.

In this case, the user terminal may include a video decoding apparatus of the present invention as described above with reference to FIGS. 1A to 20. As another example, the user terminal may include a video encoding apparatus of the present invention as described above with reference to FIGS. 1A to 20. Alternatively, the user terminal may include both the video decoding apparatus and the video encoding apparatus of the present invention as described above with reference to FIGS. 1A to 20.

Various applications of a video encoding method, a video decoding method, a video encoding apparatus, and a video decoding apparatus according to various embodiments described above with reference to FIGS. 1A to 20 have been described above with reference to FIGS. 21 to 27. However, methods of storing the video encoding method and the video decoding method in a storage medium or methods of implementing the video encoding apparatus and the video decoding apparatus in a device, according to various embodiments, are not limited to the embodiments described above with reference to FIGS. 21 to 27.

It will be understood by those of ordinary skill in the art that various changes in form and details may be made therein without departing from the spirit and scope of the invention as defined by the appended claims. The embodiments should be considered in a descriptive sense only and not for purposes of limitation. Therefore, the scope of the invention is defined not by the detailed description of the invention but by the appended claims, and all differences within the scope will be construed as being included in the present invention.

The invention claimed is:

1. An interlayer video decoding method comprising:
   obtaining brightness compensation information indicating whether a second layer current block performs brightness compensation;
   determining whether a candidate of the second layer current block is usable as a merge candidate based on whether the brightness compensation information indicates that the brightness compensation is performed and whether the candidate of the second layer current block performs time direction inter prediction;
   generating a merge candidate list including at least one merge candidate based on a result of the determining; and determining motion information of the second layer current block by using motion information of one of the at least one merge candidate.

2. The interlayer video decoding method of claim 1, wherein, when the brightness compensation information of the second layer current block indicates that the brightness compensation is performed and the candidate of the second layer current block performs the time direction inter prediction, the merge candidate list is generated excluding the candidate of the second layer current block.

3. The interlayer video decoding method of claim 1, wherein the candidate is based on motion information of a corresponding block indicated by a disparity vector of the second layer current block from a location of the second layer current block.

4. The interlayer video decoding method of claim 1, wherein the candidate is based on motion information of a right lower block of a corresponding block indicated by a disparity vector of the second layer current block from a location of the second layer current block.

5. The interlayer video decoding method of claim 1, wherein, when the brightness compensation information indicates that the brightness compensation is performed, some or all of other candidates having a same motion vector and a same reference index as a motion vector and a reference index from among motion information of the candidate are not included in the merge candidate list.

6. The interlayer video decoding method of claim 1, wherein, when the brightness compensation information indicates that the brightness compensation is performed, some or all of other candidates having a same reference index from among motion information of the candidate are not included in the merge candidate list.

7. The interlayer video decoding method of claim 1, wherein the candidate is based on motion information of a block corresponding to a disparity vector of the second layer current block from a location of the second layer current block, and the interlayer video decoding method further comprises, when the brightness compensation information indicates that the brightness compensation is not performed, determining a vertical component of the disparity vector to be 0.

8. A non-transitory computer-readable recording medium having recorded thereon a program, which when executed by a computer, performs the interlayer video decoding method of claim 1.

9. An interlayer video encoding method comprising:
determining whether a second layer current block performs brightness compensation;
determining whether a candidate of the second layer current block is usable as a merge candidate based on whether the second layer current block performs the brightness compensation and whether the candidate of the second layer current block performs time direction inter prediction;
generating a merge candidate list including at least one merge candidate based on a result of the determining; and
determining motion information of the second layer current block by using motion information of one of the at least one merge candidate.

10. The interlayer video encoding method of claim 9, wherein, when the second layer current block performs the brightness compensation and the candidate of the second layer current block performs the time direction inter prediction, the merge candidate list is generated excluding the candidate of the second layer current block.

11. The interlayer video encoding method of claim 9, wherein the candidate is based on motion information of a corresponding block indicated by a disparity vector of the second layer current block from a location of the second layer current block.

12. The interlayer video encoding method of claim 9, wherein the candidate is based on motion information of a right lower block of a corresponding block indicated by a disparity vector of the second layer current block from a location of the second layer current block.

13. The interlayer video encoding method of claim 9, wherein, when the second layer current block performs the brightness compensation, some or all of other candidates having a same motion vector and a same reference index as a motion vector and a reference index from among motion information of the candidate are not included in the merge candidate list.

14. A non-transitory computer-readable recording medium having recorded thereon a program, which when executed by a computer, performs the interlayer video encoding method of claim 9.

15. An interlayer video decoding apparatus comprising:
a brightness compensation information obtainer configured to obtain brightness compensation information indicating whether a second layer current block performs brightness compensation;
a merge candidate list generator configured to determine whether a candidate of the second layer current block is usable as a merge candidate based on whether the brightness compensation information indicates that the brightness compensation is performed and whether the candidate of the second layer current block performs time direction inter prediction, and generate a merge candidate list including at least one merge candidate based on a result of the determining; and
a motion information determiner configured to determine motion information of the second layer current block by using motion information of one of the at least one merge candidate.

* * * * *